US012179999B2

(12) United States Patent
Hallman

(10) Patent No.: US 12,179,999 B2
(45) Date of Patent: Dec. 31, 2024

(54) IN-GROUND RECEPTACLE AND INSTALLATION THEREOF

(71) Applicant: EarthBin Inc., Hamilton (CA)

(72) Inventor: David Hallman, Innerkip (CA)

(73) Assignee: EarthBin Inc., Hamilton (CA)

( * ) Notice: Subject to any disclaimer, the term of this patent is extended or adjusted under 35 U.S.C. 154(b) by 82 days.

(21) Appl. No.: 18/074,397

(22) Filed: Dec. 2, 2022

(65) Prior Publication Data

US 2023/0278783 A1 Sep. 7, 2023

Related U.S. Application Data

(60) Provisional application No. 63/317,339, filed on Mar. 7, 2022.

(51) Int. Cl.

*B65F 1/14* (2006.01)
*B65F 1/16* (2006.01)

(52) U.S. Cl.

CPC .......... *B65F 1/1447* (2013.01); *B65F 1/1615* (2013.01); *B65F 2210/148* (2013.01); *B65F 2210/20* (2013.01); *B65F 2240/152* (2013.01)

(58) Field of Classification Search

CPC .................. B65F 1/1447; B65F 1/1615; B65F 2210/148; B65F 2210/20; B65F 2240/00–152; B65F 2210/132; B65F 2210/1443

See application file for complete search history.

(56) References Cited

U.S. PATENT DOCUMENTS

| | | | |
|---|---|---|---|
| 2,528,056 | A | 10/1950 | Henry |
| 3,009,603 | A | 11/1961 | Stockdale |
| 3,050,209 | A | 8/1962 | Germaine et al. |
| 3,307,739 | A | 3/1967 | Cloyd |

(Continued)

FOREIGN PATENT DOCUMENTS

| | | | |
|---|---|---|---|
| CA | 2744818 | A1 | 1/2012 |
| DE | 2431090 | A1 | 1/1976 |

(Continued)

OTHER PUBLICATIONS

TotalPatent: Abstract—English machine translation of EP2517981A1 as published on Oct. 31, 2012.

(Continued)

*Primary Examiner* — Kareen K Thomas

(74) *Attorney, Agent, or Firm* — Smart & Biggar LP

(57) ABSTRACT

An in-ground apparatus includes a receptacle and a liner into which the receptacle can be placed and removed. The liner may be a molded plastic liner having a tapering body to permit stacking. The lower margin includes a set of seats for anchor fittings in the form of re-bar prongs that, when installed, extend radially outwardly from the liner. The seats, and hence the prongs, are located upwardly of the bottom edge of the liner so that they are embedded above and below when concrete is poured around the bottom of the liner. The receptacle is formed to contain liquids, such as used cooking oil and hot grease. It has a heating element wrapped around the receptacle, and insulation between the receptacle and the liner. There is an internally concealed pump-out with a swiveling access fitting.

20 Claims, 14 Drawing Sheets

(56) References Cited

U.S. PATENT DOCUMENTS

| | | | | |
|---|---|---|---|---|
| 3,634,989 | A | 1/1972 | Rogers | |
| 3,701,262 | A * | 10/1972 | Connell | F17C 3/005 405/53 |
| 3,708,085 | A | 1/1973 | Bumpas | |
| 3,893,538 | A | 7/1975 | Thompson | |
| 4,082,184 | A | 4/1978 | Hammer | |
| 4,570,812 | A | 2/1986 | Curtis | |
| 4,659,251 | A | 4/1987 | Petter | |
| 4,775,066 | A | 10/1988 | Keppeler | |
| 4,960,346 | A | 10/1990 | Tamayo | |
| 5,238,356 | A | 8/1993 | Salli | |
| 5,339,974 | A | 8/1994 | Raghunathan | |
| 5,421,478 | A * | 6/1995 | Lovato | B65D 90/24 220/567.2 |
| 5,879,106 | A | 3/1999 | Beamer | |
| 6,112,935 | A | 9/2000 | Shackelford | |
| 6,443,656 | B1 | 9/2002 | Gunter | |
| 7,690,150 | B2 | 4/2010 | Orschulik | |
| 7,774,988 | B2 | 8/2010 | Guitoneau | |
| 8,096,439 | B2 | 1/2012 | Fogerlie | |
| 8,534,482 | B2 | 9/2013 | Tuunanen et al. | |
| 9,056,717 | B2 | 6/2015 | Lobban | |
| 9,066,511 | B2 | 6/2015 | McKnight | |
| 9,451,761 | B2 | 9/2016 | Messina | |
| 9,938,077 | B2 | 4/2018 | Hallman | |
| 10,207,865 | B2 | 2/2019 | Hallman | |
| 10,633,178 | B2 | 4/2020 | Hallman | |
| 2008/0203097 | A1 | 8/2008 | Cardoso Cabral Martins da Silva et al. | |
| 2009/0120013 | A1 | 5/2009 | Meyers | |
| 2009/0242565 | A1 | 10/2009 | McLachlan | |
| 2010/0108688 | A1 | 5/2010 | Stein | |
| 2013/0111801 | A1 | 5/2013 | White | |
| 2020/0235556 | A1 * | 7/2020 | Aycock | H02B 1/56 |

FOREIGN PATENT DOCUMENTS

| | | | |
|---|---|---|---|
| EP | 0240748 | A1 | 10/1987 |
| EP | 0812785 | A1 | 12/1997 |
| EP | 1061011 | A1 | 12/2000 |
| EP | 2107017 | A1 | 10/2009 |
| EP | 1661827 | A1 | 3/2010 |
| EP | 2189396 | A1 | 5/2010 |
| EP | 2517981 | A1 | 10/2012 |
| EP | 2380824 | A1 | 11/2017 |
| SE | 509286 | C | 10/1930 |
| WO | 1999051 | A1 | 10/1999 |
| WO | 2006032073 | A1 | 3/2006 |

OTHER PUBLICATIONS

TotalPatent: Abstract—English machine translation of DE2431090A1 as published on Jan. 8, 1976.

TotalPatent: Abstract—English machine translation of SE509286 as published on Jan. 11, 1999.

TotalPatent: Abstract—English machine translation of EP1061011 as published on Dec. 20, 2000.

Durabac, CSE-6500-P, Double layered polyethylene buried container, retrieved online on Oct. 15, 2010.

Durabac, CSE-8000, 8 yard capacity polyetylene Front Load Bin buried in the concrete casement, as published on www.durabac.ca, in Aug. 2012.

Ecoloxia, sales brochure as published at www.ecoloxia.ca/produits.html; copyright dated 2011.

Ecoloxia, sales brochure as published at www.groung-hog.ca/index.html; dated at least as early as Jul. 13, 2011.

Instructions installation manual: L&T Cube, dated at least as early as Dec. 2012.

Installation Manual: M-5000, M-3000 & M-1300; Installation Manual, Appendix 1 to RFQ#Jul. 2013, published in January of 2012, by Molok North America Ltd.

BFI Canada: Installing a Front-Load In-Ground Container, dated at least as early as Aug. 29, 2012.

L&T advertisement of DeepLine Underground Waste Containers, Jun. 6, 2010.

Square Deep Load Underground Containers, as advertised by Ecoloxia in Nov. 2011.

FinBin Cube, Economical waste collection has never looked so good; retrieved from www.finbin.fi; dated at least as early as 2012.

* cited by examiner

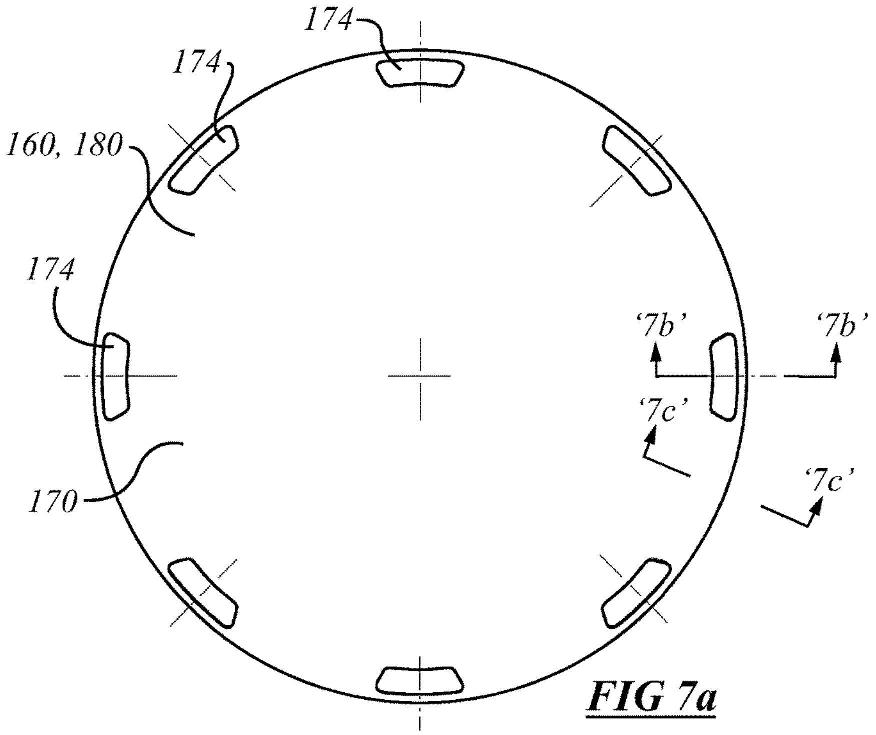
FIG 7a
FIG 7b
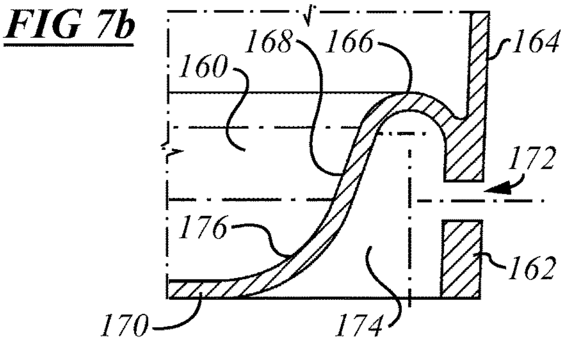
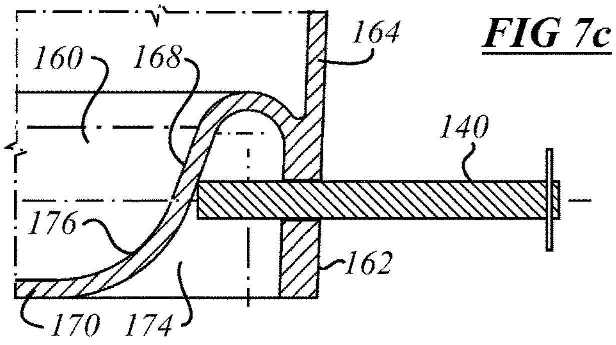
FIG 7c
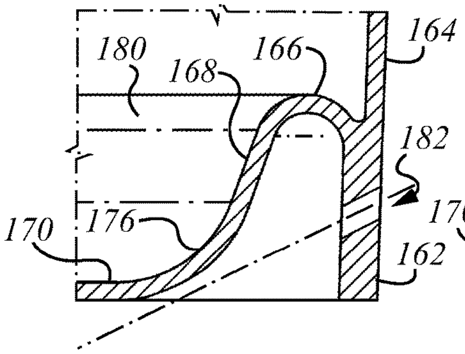
FIG 7d
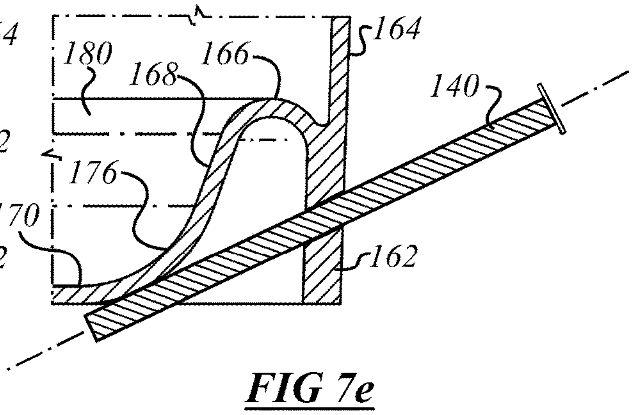
FIG 7e

IN-GROUND RECEPTACLE AND INSTALLATION THEREOF

This application claims the benefit of the priority of U.S. Provisional Patent Application Ser. No. 63/317,339 filed Mar. 7, 2022, the specification and drawings thereof being incorporated in their entirety herein by reference.

FIELD OF THE INVENTION

This invention relates to the field of in-ground receptacle installations.

BACKGROUND OF THE INVENTION

Waste removal has long presented logistical challenges. In some locations, such as fast-food restaurants, or in urban areas, a large waste receptacle is employed. Typically, the waste receptacle is filled by persons depositing waste over a period of time, and is emptied once or twice a week by a truck That typically has a lifting device, such as lifting forks, and may have a compacting ram. Large receptacles, such as dumpsters, are frequently used for this purpose.

Whereas dumpsters tend to sit on the ground, it is also known to provide refuse collection apparatus that is partially buried, or that sits in a well in which a significant portion of the apparatus is located below grade. An apparatus that sits partially below grade may tend to be less accessible to animals, may tend to be less easily overturned, may tend to be more resistant to freezing in winter, and may tend to stay cooler during days of warm sunshine. When the refuse remains at a cooler temperature, it may tend not to be as strong a source of odours. Low lift height provides for safer and more ergonomic loading of the bin—that is, the deposit by users occurs at a low and convenient height. In addition, no fencing is required in municipalities, which may tend significantly to reduce waste system requirements. The treatment of grease and oils, such as used cooking oil, used motor oil or used mineral oil presents a further challenge, particularly in regions having cold winters that make the oil difficult to pump.

SUMMARY OF THE INVENTION

In an aspect of the invention there is a ground well liner having a bottom member and a peripheral wall standing upwardly therefrom with a chamber defined therewithin. The peripheral wall has an upper region and a lower region. The lower region of the peripheral wall has an array anchor seats defined therein. The anchor seats define moment connections.

In another aspect there is an in-ground receptacle that has an outer wall structure that seats at least partially in the ground. It has an inner wall structure that nests within the outer wall structure. The inner wall structure defines a liquid containing receptacle. The receptacle is spaced from the outer wall structure. There is a heating element mounted to the inner wall structure outside the receptacle.

In a feature of that aspect, there is a layer of thermal insulation between the outer wall structure and the inner wall structure, and the heating element is located between them. In another feature, the receptacle has an opening through which to pour material into the receptacle, and a recessed flow brake forces deviation of flow of materials introduced through the opening. In a further feature, the recessed flow brake includes at least a first strainer, and there is a second strainer underlying the first strainer, and all flow paths through the first and second strainers require deviation of fluid passing therethrough. In still another feature the strainer assembly is made of steel and is permanently captured in place. In another feature, the in-ground receptacle has a lid that is movable between an open position and a closed position relative to the receptacle. There is an off-take through which the receptacle is emptied. The off-take has an outlet. When the lid is closed, the outlet is within the lid. In another feature, the outlet includes a variable orientation coupling. In still another feature, the heating element has an automated thermostatic control. In a further feature, the thermostatic control has a set point below the freezing point of water. In still another feature, the liquid containing receptacle is jacketed by thermal insulation located between the liquid containing receptacle and the outer wall receptacle.

In another aspect, there is an in-ground receptacle having a double-walled liquid containment receptacle operable to contain used oil. The receptacle has an above ground portion and a below ground portion. The below ground portion has a depth. The above ground portion has a height. The depth is greater in magnitude than that height.

In a feature, the double walled liquid containment receptacle has an inner well and an outer ground liner. There is a jacket of thermal insulation between the inner well and the outer ground liner. In another feature there is a heating element mounted to the inner well and the receptacle has an automated controller, at least a first temperature sensor, and a thermostat. The controller is operable automatically to heat materials within the containment receptacle according to a setting of the thermostat. In still another feature, the receptacle has an opening through which liquids can be poured. There is a strainer assembly that partially obstructs the opening. There is a pump-out apparatus. The strainer is permanently captured in place. In a further feature, the receptacle has a lid that is movable between open and closed positions. When the lid is closed the pump-out is concealed within the receptacle. In still another feature, the pump-out passes through the strainer assembly. In another feature, the pump-out apparatus includes a lock. In a yet further feature the lid has a lock.

BRIEF DESCRIPTION OF THE DRAWINGS

These aspects and other features of the invention can be understood with the aid of the following illustrations of a number of exemplary, and non-limiting, embodiments of the principles of the invention in which:

FIG. 7*a* shows a plan view of a bottom portion of an alternate embodiment of liner assembly to that of FIG. 2*a;*

FIG. 7*b* shows a cross-section of the liner of FIG. 7*a* taken on section '7*b*-7*b*' of FIG. 7*a*, being analogous to the cross-section of FIG. 5*a;*

FIG. 7*c* shows the cross-section of FIG. 7*b* with an anchor rod seated therein;

FIG. 7*d* show an alternate embodiment to that of FIG. 7*b*; and

FIG. 7*e* shows the embodiment of FIG. 7*d* with an anchor rod;

DETAILED DESCRIPTION

Figure 1A:
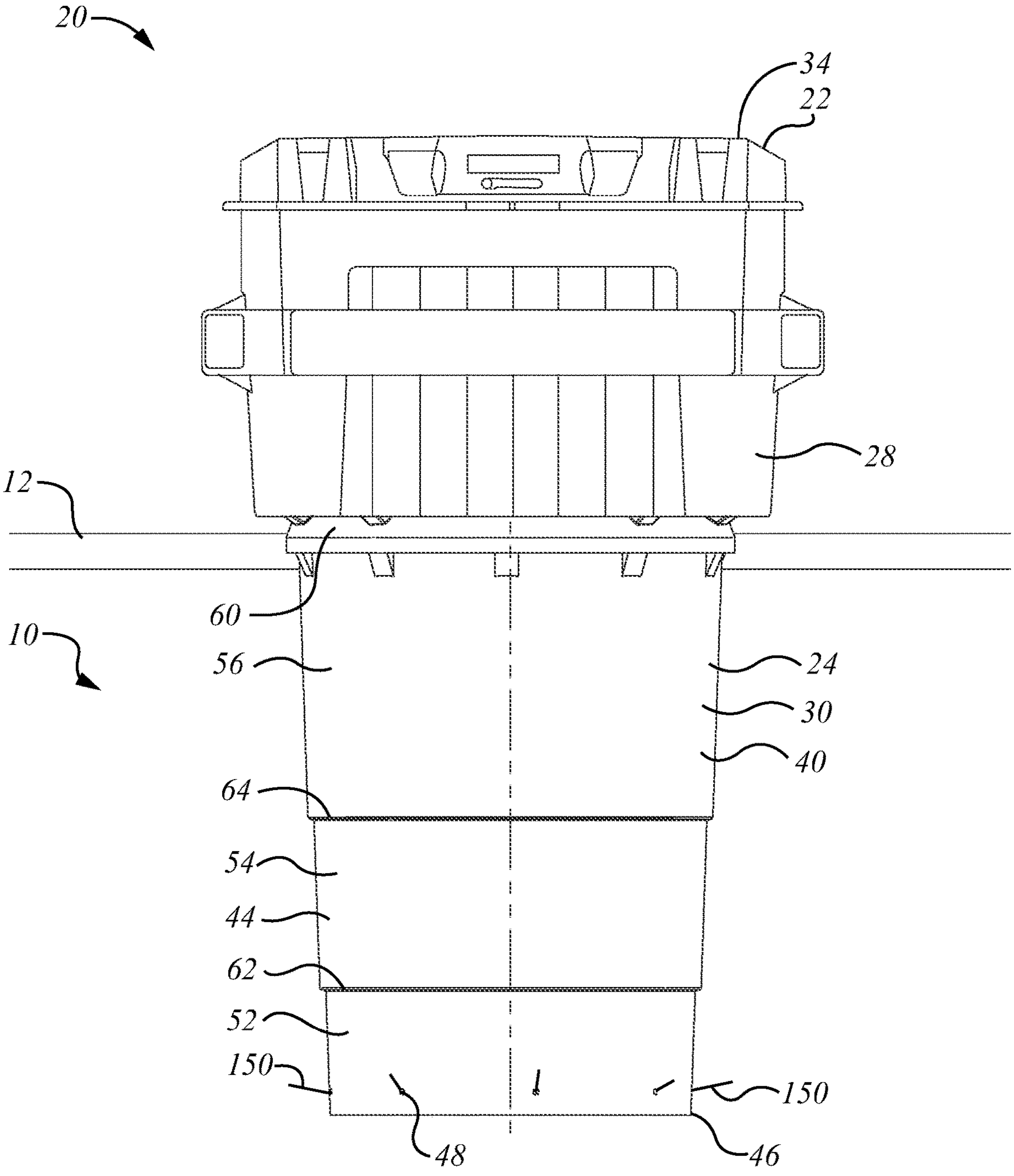
FIG. 1*a* shows a perspective general assembly view of an apparatus installation according to the present invention as installed with a soil or gravel cover.
Figure 1B:
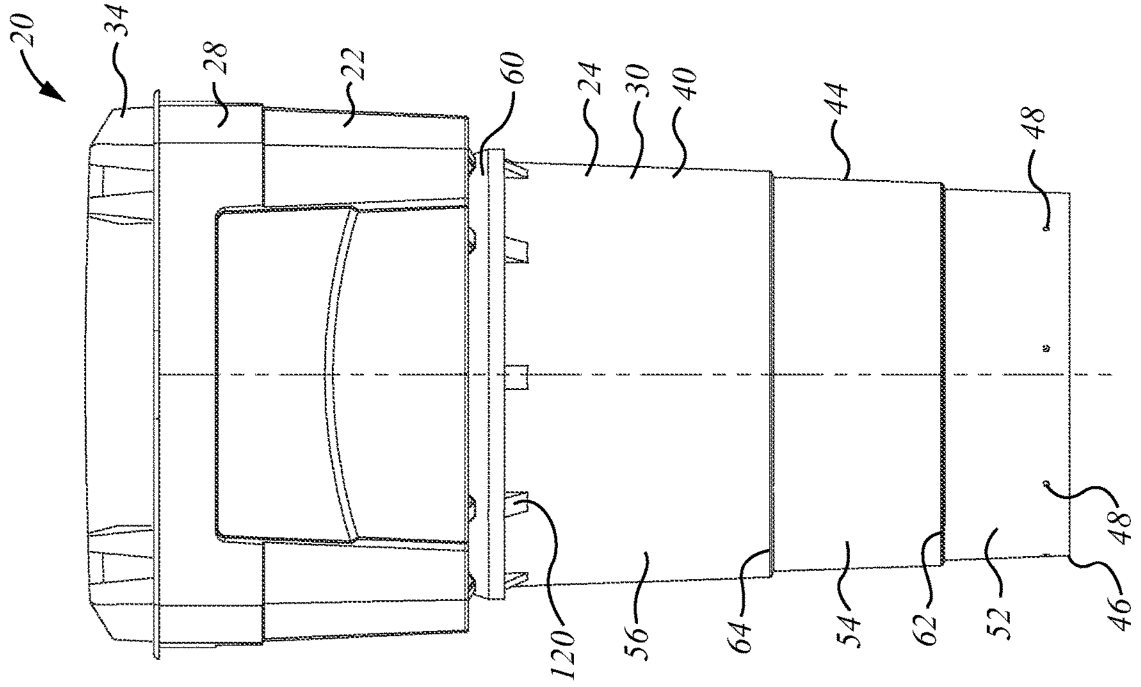
FIG. 1*b* shows the apparatus of FIG. 1*a* in side view.
Figure 1C:
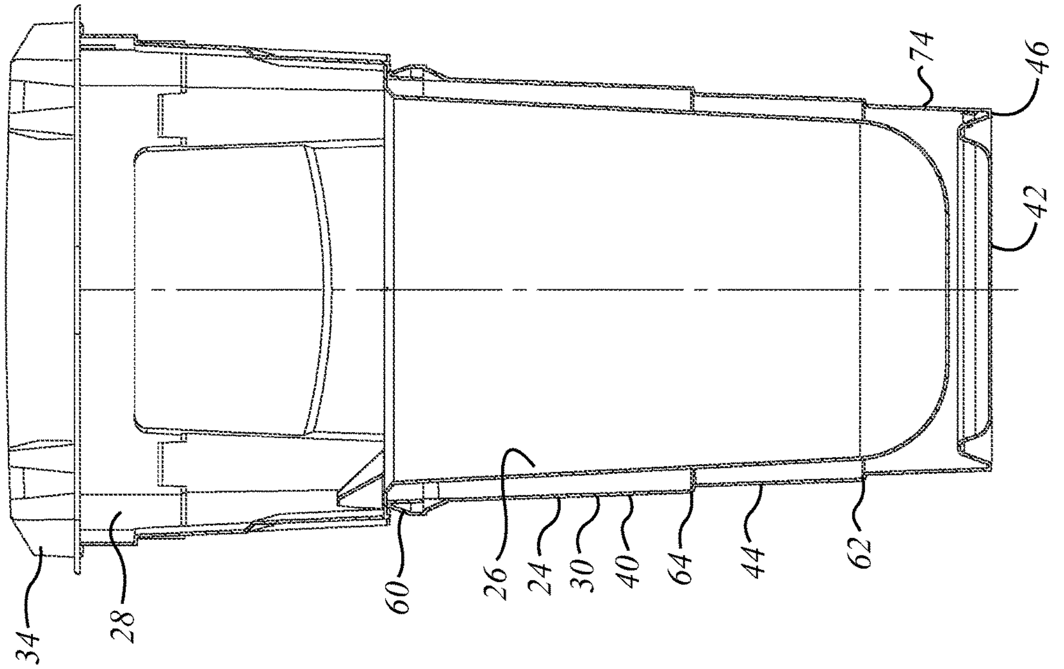
FIG. 1*c* shows the apparatus of FIG. 1*a* in cross-section.

The description that follows, and the embodiments described therein, are provided by way of illustration of an example, or examples, of particular embodiments incorporating one or more of the principles, aspects and features of the present invention. These examples are provided for the purposes of explanation, and not of limitation, of those principles and of the invention. In the description, like parts are marked throughout the specification and the drawings with the same respective reference numerals. The drawings may be understood to be to scale and in proportion unless otherwise noted. The wording used herein is intended to include both singular and plural where such would be understood, and to include synonyms or analogous terminology to the terminology used, and to include equivalents thereof in English or in any language into which this specification many be translated, without being limited to specific words or phrases.

The scope of the invention herein is defined by the claims. Though the claims are supported by the description, they are not limited to any particular example or embodiment, and any claim may encompass processes or apparatus other than the specific examples described below. Other than as indicated in the claims themselves, the claims are not limited to apparatus or processes having all of the features of any one apparatus or process described below, or to features common to multiple or all of the apparatus described below. It is possible that an apparatus, feature, or process described below is not an embodiment of any claimed invention.

For the purposes of this description, it may be that a cylindrical polar frame of reference may be employed. That is, the description may pertain to bins and bin liners that are formed as bodies of revolution about a central longitudinal axis. In such a frame of reference, the longitudinal axis, being the long axis of the apparatus, may be the vertical or z-axis, and the liner or bin may have a circumferentially extending wall that varies in radius as a function of vertical height. In such a frame of reference, the long, or largest, dimension of an object may be considered to extend in the direction of the z-axis, the base of the article, where substantially planar, may be considered to extend in an r-theta plane, and the height of the article may be measured in the vertical, or z-direction. Unless noted otherwise, the terms "inside" and "outside", "inwardly" and "outwardly", refer to location or orientation relative to the bin or liner walls. In this description, when an item, or structure, or wall, is indicated as being insulated, such term is understood to mean that the wall has a layer of insulation. In this specification, the commonly used engineering terms "proud", "flush" and "shy" may be used to denote items that, respectively, protrude beyond an adjacent element, are level with an adjacent element, or do not extend as far as an adjacent element, the terms corresponding conceptually to the conditions of "greater than", "equal to" and "less than".

The terminology used in this specification is thought to be consistent with the customary and ordinary meanings of those terms as they would be understood by a person of ordinary skill in the art in North America. The Applicants expressly exclude all interpretations that are inconsistent with this specification, and, in particular, expressly exclude any interpretation of the claims or the language used in this specification such as may be made in the USPTO, or in any other Patent Office, other than those interpretations for which express support can be demonstrated in this specification or in objective evidence of record, demonstrating how the terms are used and understood by persons of ordinary skill in the art, or by way of expert evidence of a person or persons of experience in the art.

Figure 8A:
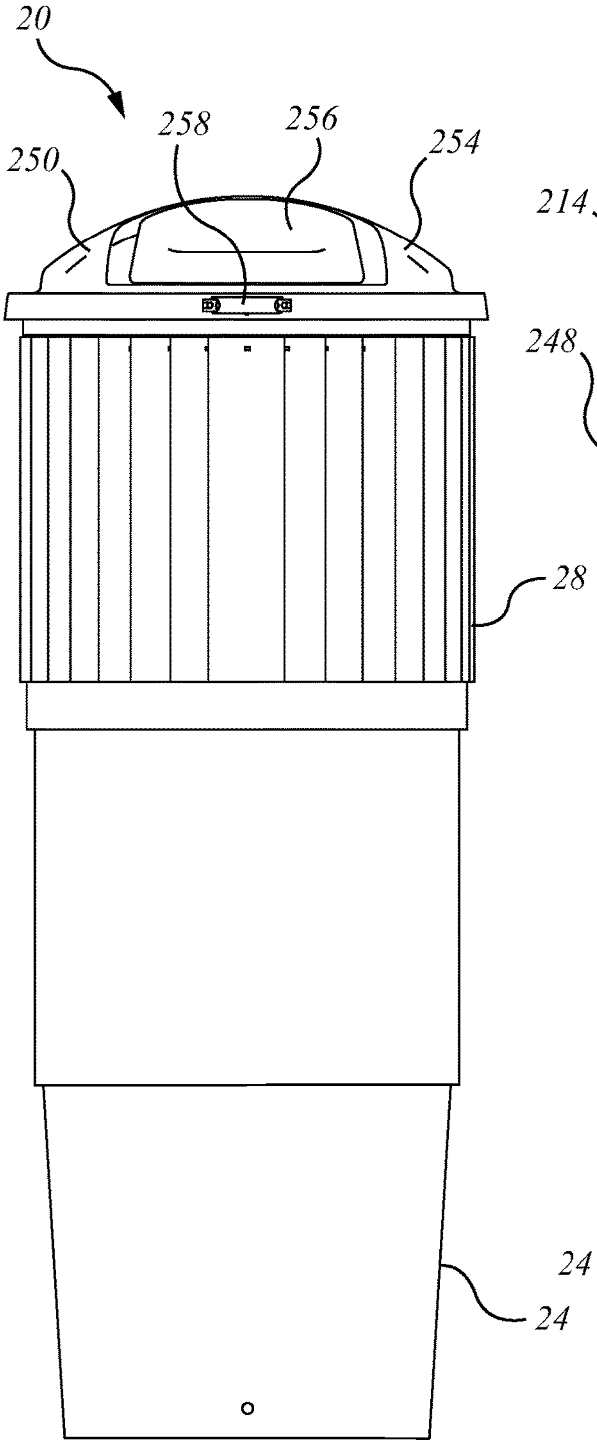
FIG. 8*a* shows a front view of an embodiment of the collection apparatus of FIG. 1*a* for the purpose of holding liquids, prior to installation in a well in the ground.

Referring to the Figures, and by way of a general overview, a collection apparatus is shown in FIG. 1*a* generally as 20, sitting in the ground 10. The ground surface, or grade, is identified as 12. Collection apparatus 20 includes a receptacle 22, and a stationary liner apparatus 24. Liner apparatus 24 lines the hole, or well, formed in the ground in which the lower portion of collection apparatus 20 seats. The lower part of liner 24 seats in the ground, and the upper visible portion of the housing 28 of collection apparatus 20 sits above ground level as installed. Receptacle 22 may typically include a wall structure or shell 30 having a chamber 32 defined therewithin in which to collect material. The description of apparatus 20 at this point is intended to be generic, i.e., without regard to the type of chamber 32 or the material that chamber 32 may be intended to receive—be it dry waste, general household waste whether wet or dry, or specialized waste such as fluids. In the description of FIG. 8*a* and onward, this description relates more specifically to the case in which receptacle 22 and chamber 32 are intended to hold liquid waste, and, in particular to the case in which the liquid waste is used cooking oil or grease. That is, in the context of the illustrated apparatus, that material may be used hot oil or grease.

Receptacle 22 may also include a closure, or covering, or top or lid, generally indicated as 34, which itself may have openings or inlets, or flaps or doors by which persons may add materials, or the top or lid may be hinged in its entirety to open and close relative to lower portion 26 of chamber 32. Receptacle 22 may also have a fitting, or fittings, 36 by which receptacle 22 is emptied, such as by being pumped out. Fittings 36 may be a hose or pipe interface fittings such as a sleeves, or coupling, or tubes 38 such as may be releasably connected to a mating coupling of a pump out apparatus, such as a pump truck for removing waste liquids, e.g., used cooking oils and greases, such as for re-cycling such oils or greases. In this process, the main lid swings open when lifted. The pump truck then connects to the pipe fitting, and the contents are then pumped out.

Figures 2A, 2B:
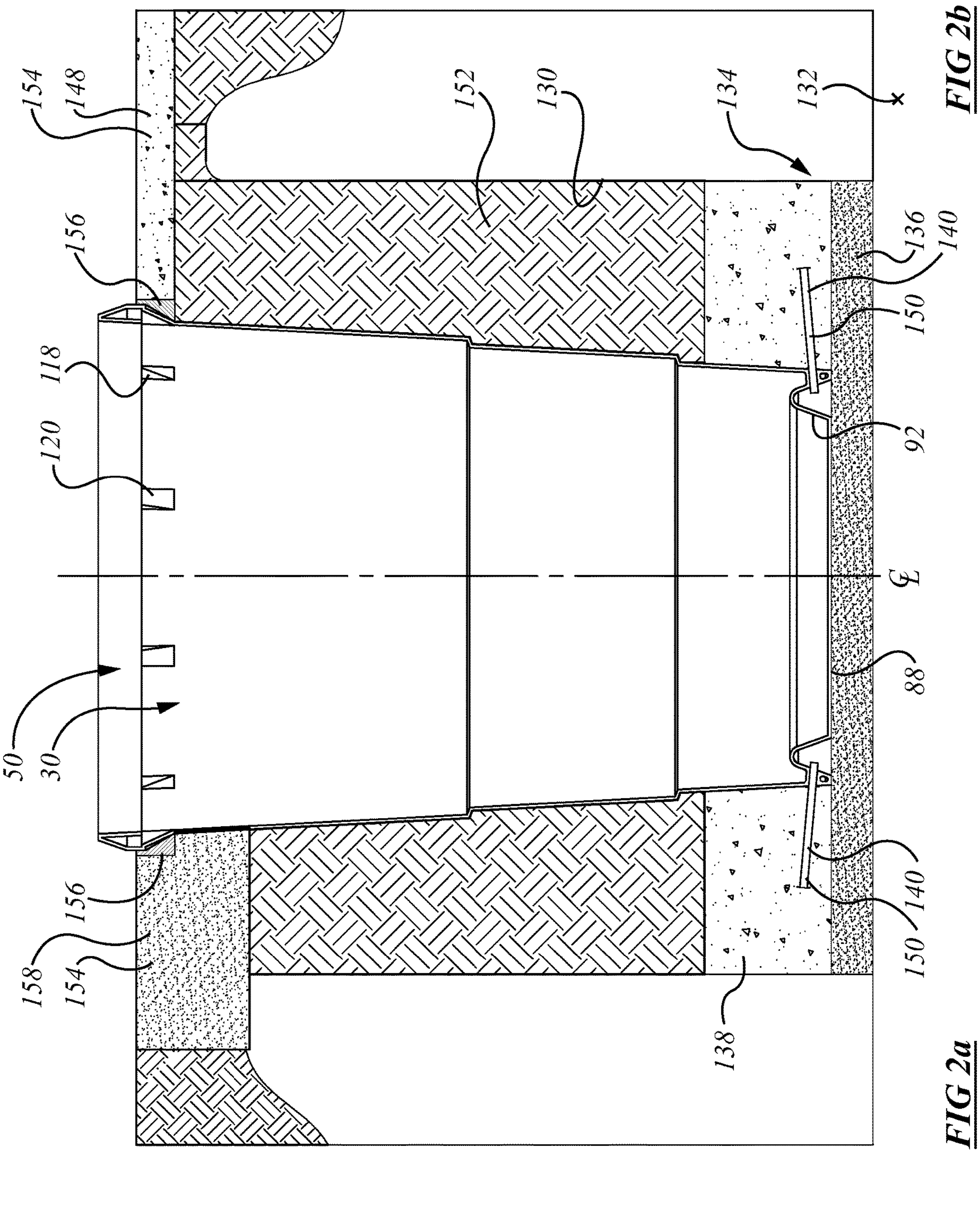
FIG. 2*a* shows a general arrangement, in cross-section, of a liner installation for the apparatus of FIG. 1*a* with a soil or compacted gravel cover.
FIG. 2*b* shows a general arrangement similar to that of FIG. 2*a*, but with a concrete installation cover.
Figure 3A:
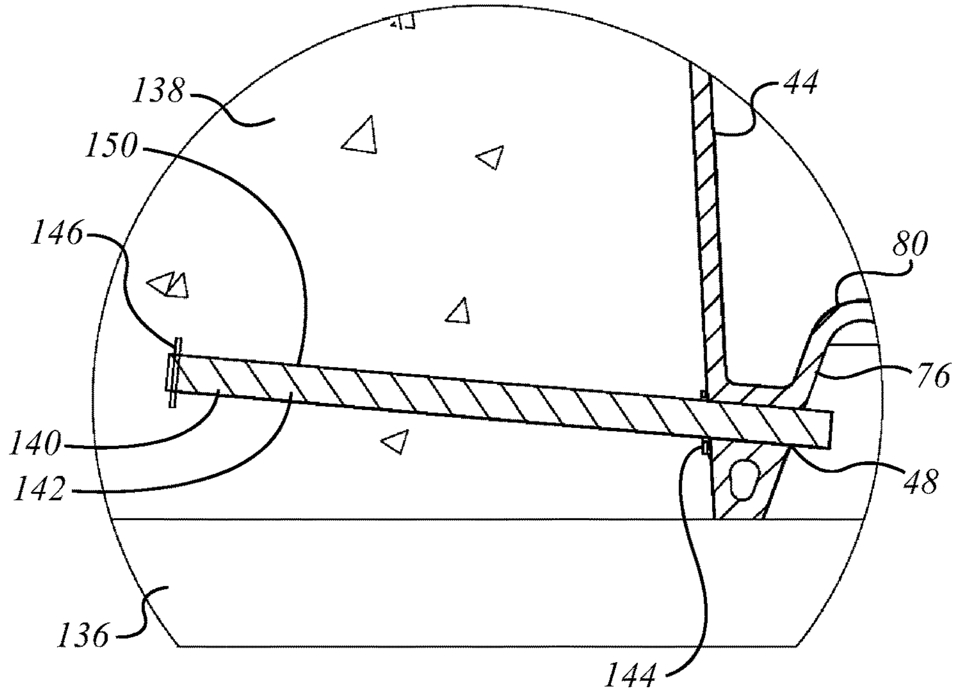
FIG. 3*a* shows an enlarged socket fitting detail of the liner installation of FIG. 2*a;*
Figure 3B:
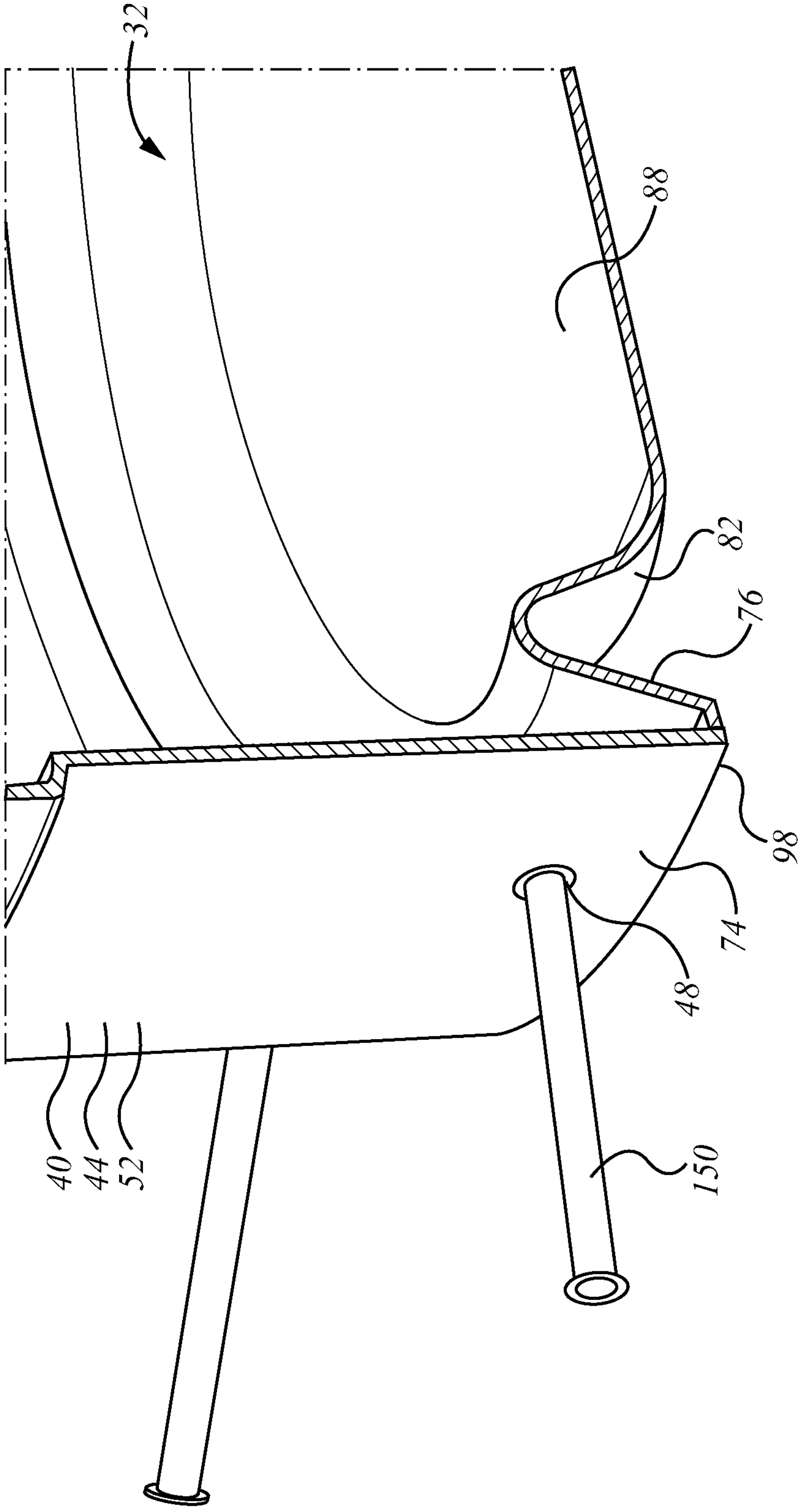
FIG. 3*b* shows a perspective view of the detail of FIG. 3*a;*

Liner apparatus 24 is shown without receptacle 22 in FIGS. 2, 3*a* and 3*b*. Liner apparatus may be taken as having the same features, and some or all of the same dimensions in respect of above ground features and appearance as the liner shown and described in U.S. patent application Ser. No. 15/145,291 filed May 3, 2016 and now issued as U.S. Pat. No. 9,938,077, the disclosure thereof being incorporated herein by reference. More generally, the above ground externally visible parts of collection apparatus 20 may be the same as, or substantially the same as, the collection apparatus shown in that patent. The in-ground dimensions of liner 24 may also be the same as liner 24 in that case, but may also be different in terms of aspect ratio of height to diameter. In that case the apparatus may tend to be intended for collecting solid waste refuse, and so on. In the present instance, by contrast, receptacle 20 may be intended for the collection of waste cooking oil or grease. Inasmuch as theft of waste cooking oil has been a matter of concern in North America, it may be helpful for the oil or grease collection apparatus to resemble non-oil or grease collecting apparatus, i.e., normal, general refuse, such that the oil and grease collecting apparatus may by installed adjacent to an ordinary refuse apparatus and may tend to look the same and not to draw attention to itself as an oil or grease container.

Liner apparatus 22 may include a liner 40 having a base portion, or member, or base wall panel 42, and a peripheral wall 44 that stands upwardly of base wall panel 42. Peripheral wall 44 and base wall panel 42 co-operate to define a chamber 50 within liner 40 in which to receive the butt end, i.e., the lower portion, of receptacle 22, liner 40 being suitably sized for that purpose. Peripheral wall 44 has a lower region 52, an intermediate region 54, and an upper region 56. At the uppermost end of upper region 56 there is a ring, or lip, or rim, or seat, indicated generally as 60. In one embodiment the depth to the underside of rim 60 may be of the order of 5 ft-7 ft, although it could be larger or smaller. In one embodiment it may be about 6½ ft. In another embodiment it may be about 10 ft. The lower, intermediate, and upper regions need not be of equal vertical depth, although they could be. In one embodiment the upper region 56 is about twice as deep as each of the intermediate and lower regions 54 and 52. In one embodiment upper region 56 is 39 inches deep; intermediate region 54 is 22 inches deep, and bottom region 52 is 18 inches deep. Each of the wall portions or wall regions may have a draft angle. Although the draft angles need not be the same it is convenient that they be the same. In one embodiment the draft angle is about 2 degrees from vertical. The draft angle permits the bodies of successive liners 40 to be nested, or stacked, one inside the other as for shipping.

Lower region 52 of peripheral wall 44 also has a lowermost end or edge or margin, indicated generally as 46, and an array of seats or receptacles, or sockets, or mounting fittings, indicated as 48, such as described in greater detail below.

Well liners have been made of such materials as poured concrete or cast iron. Peripheral wall 44, and all of liner 24, may be produced as a molded product. In particular liner 24 may be a rotationally molded product. The liner may be quite deep. The outside bottom diameter of the liner may be of the order of somewhat less than 4 ft. (e.g., approx. 42-44 inches); and the outside top diameter inside the rim (i.e., the sidewall diameter, not the overall diameter over the rim) may be somewhat less than 5 ft. (e.g., approx. 54-57 inches). The material of the molded product may be a plastic, or polymer, such as PVC or ABS or a polyolefin.

Figure 6:
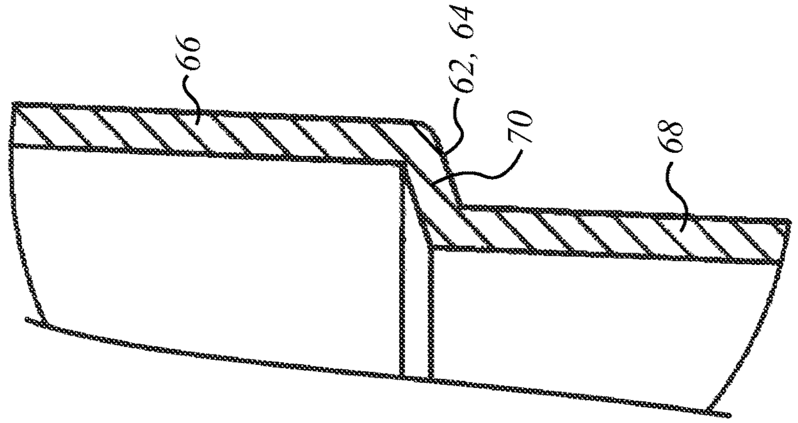
FIG. 6 shows another enlarged detail of the liner of FIG. 1*c;*

The material of the molded product may have a thickness, which may be ¼" to ⅜ or ½" (6 mm-10 mm-12 mm), for example, that is small, or very small, relative to the diameter (and therefore to the circumference) of the peripheral wall at any given height, and that may likewise be small relative to the lineal height along the slope of the wall from bottom to top. As such, it may be considered to be a web with relatively low resistance to buckling. Peripheral wall may have sectional reinforcement, or sectional stiffening at one or more locations spaced between bottom wall or member 42 and rim 60. That stiffening may have the form of a wall step, or jog, as at 62, 64, which may be circumferentially extending out-of-plane discontinuities, or ridges, or folds, or ribs or shoulders. As shown in the detail of FIG. 6, each rib has an upper web portion 66, a low web portion 68, and a shoulder or rib or step 70. The discontinuity in the section defined by rib 70 may tend to affect the bending stiffness of the adjacent structure for a distance of 20-40 wall thicknesses away from the rib. That is, rib 70 may tend to act as a shear web extending between upper web portion 66 and lower web portion 68, such that a Z-section is formed, with portions 66 and 68 acting as opposed flanges. The radial extent of rib 70 (or, equivalently, the radial offset of web portion 66 from web portion 68 immediately above and below the discontinuity) may be about ¾"-1", where the wall thickness of the web is about 0.25-0.3", such that the local second moment of area for resistance in out-of-plane bending in the r-direction is perhaps as much as 30-50 times the stiffness of the adjacent web. This may tend to make the steps 62, 64 function as local buckling resistant nodes. Although only two such stiffeners or ribs are shown, there could be more than two. The spacing of any such stiffeners may be closer together with increasing depth.

Figure 5A:
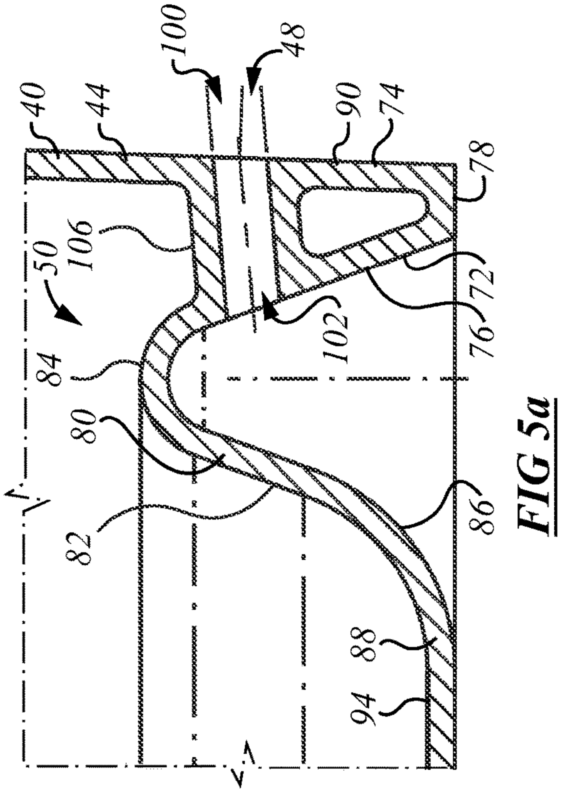
FIG. 5*a* shows an enlarged detail of the liner of FIG. 1*c*; at the location of an anchor fitting.

As seen in larger detail in FIG. 5, at the bottom of liner 40, the lowermost edge may also have, or be formed to have, a stiffener feature, as indicated as stiffener 72. Stiffener 72 may define a beam, or beam section, 80, such as may resist deflection in the vertical direction and in the radial direction. That is, the bottom margin or skirt 74 of peripheral wall 44 may define, and in the embodiment shown does define, one element of a beam. Radially inwardly of skirt 74 may be a circumferentially extending leg 76. In one embodiment, leg 76 may be formed as a truncated conical ring. The lower end of the ring defined by leg 76 is joined to the bottom edge or bottom extremity of skirt 74 as at a web, or junction, or shear flow connection 78. The beam structure or section 80 may also include a third portion or leg 82, which may also be a truncated conical ring, and which may be joined to leg 76 by a first radiused portion 84 which may define a shear flow connection between leg 76 and leg 82. Leg 82 is itself connected by a second radiused portion 86 to a main, central, spanning panel or web 88 that closes the end of bottom panel of base wall member 42.

Figure 5B:
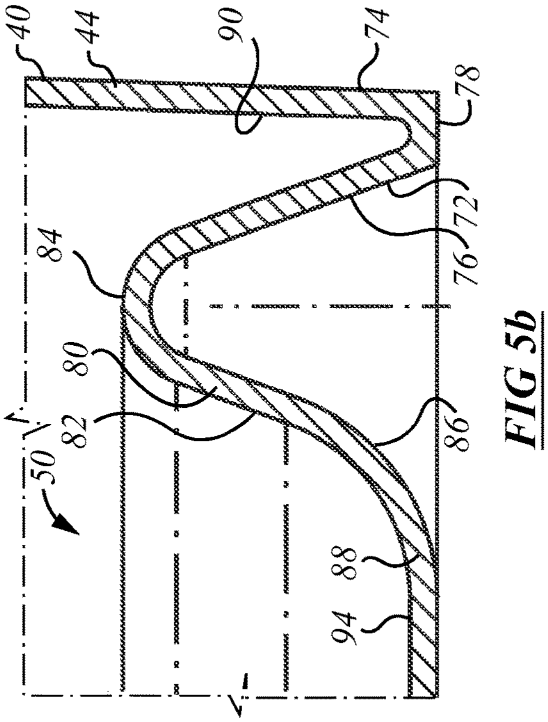
FIG. 5*b* shows an enlarged detail of the liner of FIG. 1*c* at a location circumferentially between anchor fittings.

As in FIG. 5*b*, the combination of leg 76, skirt 74 and shear flow connection 78 may tend to form a channel section. The embodiment illustrated shows an upwardly-opening V-shaped channel 90 that defines a beam that has greater stiffness in resistance to radial bending than skirt 74 alone, and the also has enhanced resistance to deflection in the axial or z-direction. This structure formed at the region of the outer peripheral lower margin of liner 40 can be thought of as a doubled, or doubled-over, or folded-over, lower skirt, or edge, or form, in which there is an outer leg, and inner leg, and a member joining the inner and outer legs, that structure providing enhanced stiffness.

Similarly, the combination of skirt 74, shear flow connection 78, leg 76, shear flow connection 82 and leg 80 may tend to form a Z-shaped section 92 that is, again, resistant to bending in the radial direction, and also resistant to bending in the axial direction. The radially outward margin 94 of spanning panel or web 88 that is influenced by leg 82 may also function as a flange attached to leg 82.

The overall diameter of the bottom end of liner 40 can be taken as the outside diameter at the corner formed between skirt 74 and shear flow connection 78. The radial extent of the Z-section may be taken as the difference in radius between that outer corner and the intersection of the tangent of leg 82 and the plane of web 88. The unsupported diametral span of web 80 is then the overall diameter less twice the radial extent of the circumferential stiffening. The circumferential edge beam has two effects on bottom panel stiffness. First, it effectively reduces the unsupported span, which has a strong effect on displacement under load. In one embodiment, the outside diameter is 46 inches, and the effective stiffener radial extent is about 5 inches, leaving an unsupported span of about 36 inches, rather than 46 inches. Second, the effect of the stiffener is such as to change the boundary condition of the membrane from a condition that may approximate a simple support to a condition more like a fixed support. Even partial stiffening of the boundary condition may tend to reduce deflection in web 88. This may reduce the tendency of web 88 to deflect upward under the force of buoyance, with a similar decrease in the tendency to impair the ability of the receptacle to seat fully downwardly within liner 40. It may also tend to transfer the vertical load into sidewall 44, and thence into anchors 140.

An array of mounting fittings, or anchor mounts, or sockets, or hard points, or seats, 48, however termed, is, or are, formed about the periphery of the lower margin of lower region 52. In one embodiment there may be 8 such fittings arrayed on 45 deg. centers. There may be more or fewer such fittings as may be appropriate.

Each such fitting may include an aperture or accommodation, or penetration, or hole 100 formed through skirt 74 at a level higher than the bottom edge 98 of skirt 74. In the embodiment shown, that distance may be approximately 3 inches. Other suitable distances may be used. A further penetration or accommodation, or hole, 102 may be made in leg 76. The respective penetrations may be radially aligned, such as to admit a common shaft or rod. The size of the holes may be suitable for accepting a standard diameter of reinforcing bar, such as ¾" re-bar. It may also be that an enclosing wall, such as a cylindrical pipe nipple or stub 104, is formed in liner 40 to extend between holes 100 and 102, forming a sealed passage such that the inside of the tub is segregated from the inside chamber. That is, in the embodiment shown, liquid can neither enter chamber 50 from outside, nor can liquid from chamber 50 leak out through fittings 48. The alignment of holes 100 and 102, and of cylindrical pipe stub 104 may be radially outwardly and upwardly, such that the centerline of the seat is angled upwardly at an angle alpha. Alpha may be of the order of 0-10 degrees, measured from horizontal, and in one embodiment is 5 degrees. It may be a relatively small angle. Since holes 100 and 102 are spaced by a radial distance, and stub 104 has a non-trivial radial extent, the socket defines a moment arm for resisting rotation. That is, it defines a moment connection, or a built-in connection as opposed to a pin-jointed connection. The mounting is set in the circumferentially extending beam, and so has the torsional resistance of that section. Spanning panel member 88 of web 42 may be flush with, i.e., co-planar with, the lowermost edge 98 of skirt 76. Alternatively, panel member 88 may be located higher than edge 98.

At the upper end of liner 40, peripheral wall 44 carries through all the way to the uppermost edge 108 of rim 60. This edge is than carried outwardly and downwardly in a peripherally extending skirt 110 that has an external conical surface defining a land or seat for engagement with or by the mating elements of receptacle 22. The lower margin of skirt 110 gives onto a circumferentially extending cylindrical band 112. There is a cavity or space 114 that is located between peripheral wall 44 and skirt 110, and between peripheral wall 44 and band 112. Liner 40 may be made by rotational molding. An array of skirt reinforcement blisters, or pockets 120 are spaced circumferentially about the upper region of wall 44. Pockets 120 may include wedge-shaped side-wall members 118 that serve to reinforce skirt 110 and also to provide a lead-in, or chamfer, or self-centering set of cams to locate liner 40 within its installation seat. Pockets 120 provide the access path by which the molding material enters the space between the inner and outer tool portions that make item 110 and the uppermost cuff of item 44. Pockets 120 may include a series of radial webs 116 such as may, in addition, serve to discourage radially inward deflection of skirt 110. An array of circumferentially spaced skirt reinforcement blisters 120 includes wedge-shaped members 118 that serve to reinforce skirt 110 and to provide a lead-in, or chamfer, or self-centering set of cams to locate liner 40 within its installation seat.

The installation configuration is shown in FIGS. 2*a* and 2*b*. A well 130 is excavated in the geological formation in which liner 40 is to be mounted. The undisturbed stratum of soil is indicated as 132. The bottom of the excavated well is shown as 134. It is either levelled, or covered with a layer of fill that is then itself levelled and compacted to form a packed base material 136.

Liner 40 has a series of anchors 140 mounted in seats 48. Anchors 140 may have the form of straight rods 142, such as the ubiquitously available ¾" re-bar, cut to length. When the re-bar sits in the seats, the extending lengths of re-bar define prongs 150. The prongs are angled upwardly. Washers 144 may be mounted on the rods, e.g., by welding, to sit tightly against the outside face of liner 40. This may tend to prevent the inside tip of the re-bar from abutting leg 80. The rods may also have a large washer or washers welded to their ends as at 146.

Figure 4:
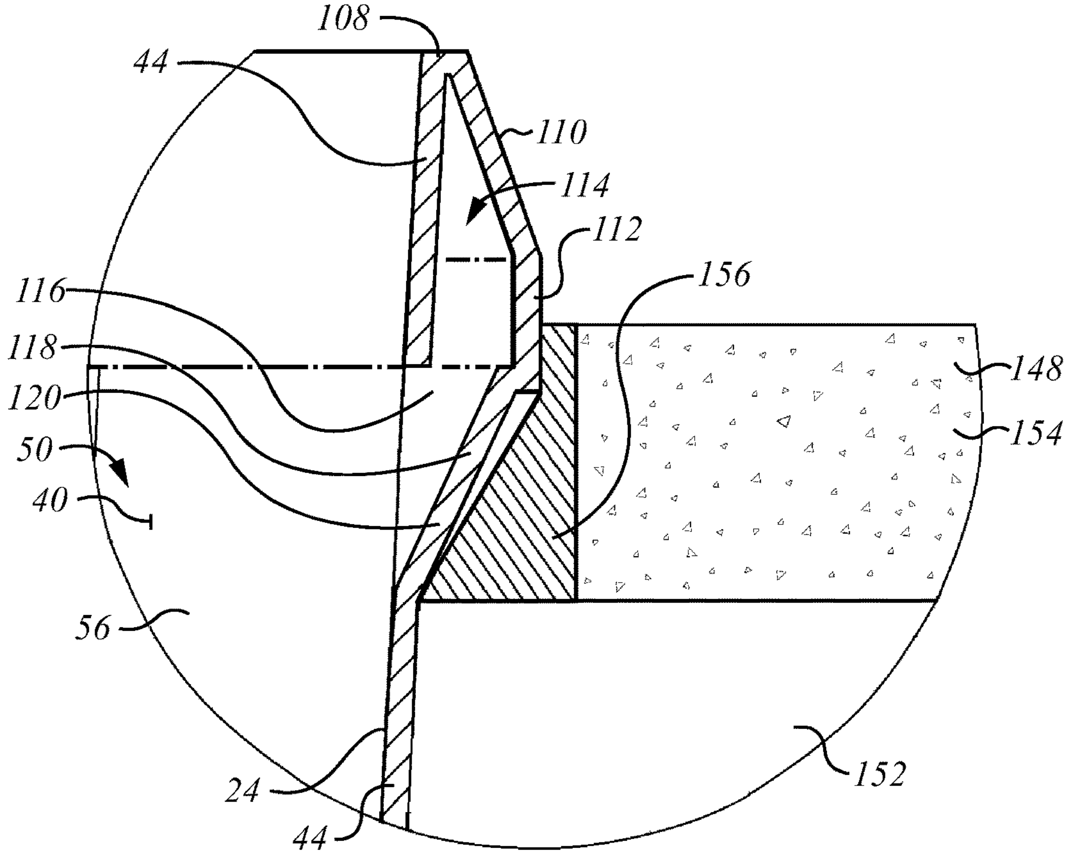
FIG. 4 shows an enlarged detail of a rim of the liner installation of FIG. 2*a;*

Liner 40, with prongs 150 installed, is lowered into the cavity, i.e., well 130. Once in position with lowermost edge 98 tight against the packed base material 136. As so positioned, a layer of concrete 138 is poured into the bottom of well 130 about the lower portion or region 52 of liner 40. Since prongs 150 are spaced upwardly from bottom edge 98, the concrete will flow beneath them, but not below edge 98, and, as the concrete is poured it embeds the prongs. When the pouring is finished, the concrete sets to form an annular footing, and anchor. Fill 152 is then placed on top of the concrete, and compacted. A surface layer 154 is added. The surface layer can be compacted gravel, as in FIG. 2*a*; or it can be a layer of concrete 148, as in FIG. 2*b*. A break, such as a sidewalk concrete expansion joint or frost break or bond break, 156 is mounted about belt or band 112. As seen in the larger detail of FIG. 4, frost break 156 may be made by a lay-up of sections of break material between adjacent blisters 116 and circumferentially around liner 40, with the outside edge or face being generally cylindrical, such that settling or heaving of the top layer, be it fill 158 or concrete 148, may tend to be less prone to "pry" on rim 60. The frost break material provides a radially inner wall of the form when concrete 148 is poured.

In the alternate embodiment of FIGS. 7*a*-7*c*, a liner 160, which may be taken as being the same as liner 40 except as indicated, has a lowermost skirt or margin, indicated generally as 162 that is doubled, i.e., is of doubled thickness as compared to sidewall 164 more generally, and that has an over-folded curved base periphery, or radiused rim, 166 that connects skirt 162 to an inner leg 168. In this instance, the doubled lower margin is a double-thickness wall, rather than the V-shaped channel legs described above. Leg 168 and bottom web central portion 170 meet at another radiused edge or corner, or transition, 176. A fitting bore, or seat 172, penetrates the double thickness. An anchor 140 locates in seat 172 as indicated in FIG. 7*c*. In this embodiment, radially inward motion of anchor 140 is inhibited by leg 168. While this section may be circumferentially continuous as in liner 40, in the embodiment of FIG. 7*a* the anchor seats are defined in a set of circumferentially spaced impressions or pockets 174 located around the bottom of liner 160.

In the alternate embodiment of FIGS. 7*d* and 7*e*, a liner 180 is similar to liner 160, but rather than having a substantially horizontal seat, or one that is back-stopped by leg 168, liner 180 has an inclined seat 182 that is slanted upwardly and outwardly, such that a somewhat longer anchor 140 locates in a manner that is roughly tangent to the bottom radius of leg 168.

In each of liner 160 and liner 180, the anchor fitting extends through a wall member of increased thickness, i.e., the local thickness, and hence the length of the bore of the anchor seat aperture, is greater than the usual through thickness of the wall web of liner 44 generally, and may therefore be less prone to tearing. Further, the use of at least two spaced apart or divergent legs, namely as at 162 and 168, connected by a web in the form of the curved radius portion 178.

The general structure of the apparatus is that of a receptacle that has an upper portion and a lower portion. The upper portion generally includes an external access by which to introduce objects into the bin, and a closure member that opens to permit the bin to be emptied. The upper portion also may have lifting apparatus, whether in the form of a lifting eye, or in the form of sleeve in which to receive the forks of a lift truck.

The lower portion generally sits buried in a well may have been prepared in the ground, sized to receive the lower portion of the bin. It may be helpful to provide a liner for the well that may have several properties. First, the liner provides a barrier to the flow of liquids to prevent ground-water from filling the sump by weeping through the subterranean earthen walls of the well. It also prevents liquids from the bin from migrating into the surrounding geological stratum, be it earth or rock. That is, some liquids in the refuse may tend to be contaminants that would be best kept out of the water table. Accordingly, it may be desirable (and, indeed, may be mandated by law and regulations) that the liner define a barrier to the passage of liquids either to or from the surrounding soil.

The liner may also define a socket that mates with the bin apparatus. For example, the top or upper region of the well liner may define a seat, i.e., a female seat or female engagement interface, in which to accommodate the bin structure. It may be that either the top portion, or the bottom portion, or the transition between the top and bottom portions may define a mating male seat. The mating engagement of the two interface may tend not to be air-tight, but may tend to exclude water, such as rainwater. That is, it is not generally desirable for the well to be prone to fill with water. When water or other liquid collects in the well, it must then be pumped out. This tends to be inconvenient. The mating may also tend to be tight enough to exclude animals.

Part of defining a socket is that the socket must fit the bin apparatus. Clearly, maintaining the socket in a condition of suitable roundness so that it mates with a round belt, or band, or cincture, of the bin, would be desirable. However, the engagement interface need not be circular (or conical), and need not necessarily be continuous. The female fitting defines a land, or an array of lands, onto which a mating interface land, or lands, or arrays of lands is placed. Given that the bin is typically lifted by the forks of a truck, the fit may tend to be either self-centering or have a sufficiently large tolerance to accommodate relatively loose mis-match of fit. In addition to horizontal planar circumferential fit (in polar-co-ordinates) or horizontal planar rectangular fit (in Cartesian co-ordinates), the well must also have a correct vertical fit.

Difficulties with both circumferential and vertical fit may arise from the combination of geological factors, water table factors, freezing and thawing, precipitation, and drainage. The well liner can be thought of as the hull of a vessel floating in water. At any time that there is significant moisture in the geological structure, the liner, as a hollow structure, may tend to be buoyant relative to the surrounding stratum. Even small and slow migration of water, over a long time any many cycles of soaking and drying, or heating and cooling, may tend to push on the liner. In particular, the bottom face of the well liner may be idealised conceptually as facing the equivalent head of pressure of water equal to the depth of the bottom face below the surface multiplied by gravity. That depth may be up to 6 ft, and the diameter of the base wall may be of the order of 4 ft. The pressure on the bottom face of the unit may then approximate a distributed load. The total force of buoyancy on the bottom face of the unit may be substantial.

This force, applied over a long enough time may cause the bottom face to bow upward, and may tend to cause the unit to try to rip upward out of its mounting. The top rim may heave upwardly, thereby causing stress in the area of the anchor pins. At least one known unit has employed concrete reinforcement bars embedded in concrete poured in the well. Unless the re-bar is well set within the concrete, it may tend to tear out.

In the embodiment of FIGS. 1*a*-2*b*, the radially extending array of prongs may tend to be difficult to tip out of the concrete annulus. First, unlike straight bars mounted in the bottom face of a bin, there is no length of exposed bar such as might be long enough to bend. When the concrete cures, the inside face of the concrete has the same size and shape as the liner, so the re-bar prongs have no space to form a bending arm. The liner cannot move away from the concrete radially, because the opposite sides of liner 40 cannot move into the concrete on the opposite face. The radial geometry means the liner has nowhere to go to slide off the prongs; and it means there is no moment arm to permit the prongs to be bent or twisted. They are constrained to deflection in shear.

While bottom panel or member 42 may tend to wish to push liner 40 upward, the hard it pushes, the more forcefully the seats are urged against the concrete, by virtue of the incline of angle alpha.

The sidewall web of liner 40 is relatively thin, as noted above. If the prongs merely passed through a single layer of ¾"-⅜" plastic, the forces working against the liner might tend, over time, to rip an axially extending hole in the web, forcing it to tear on the prong, as if the prong were a dull knife cutting through the plastic. However, the spacing of apertures 100 and 102, the use of an enclosing plastic cylinder 106, and the citing of the cylinder in the webs of a V-shaped beam may tend to spread the reaction of the prong along the circumference of the web, meaning that a greater area of material works to resist the force of buoyancy working against bottom panel or member 42. This arrangement may facilitate manufacturing, e.g., as by rotational molding, and may yield an approximately uniform wall thickness.

On installation, unlike some other kinds of containers, an in-ground apparatus may sometimes be placed or installed behind a curb to save or retain parking lot space, given that the forks of a lift truck may extend well forward of the truck itself. In the cylindrical or truncated conical form embodiments landscaped areas and may be rotated for easier truck access. Before excavating the well, the installer may wish to consider the driving habits of persons in the area; whether room is needed for large vehicles such as trucks or buses to turn, or to reverse; where emergency vehicles are likely to require access in case of fire; where snow plowing is likely to occur or where snow is likely to be piled; and whether the area is one of high pedestrian traffic; and any other site-specific activities that may interfere with the installation, loading and emptying. The site must have room for the lift-truck, and any maneuvering required by the lift-truck, and must be clear of overhead obstructions, such as electrical wires, awnings, signs and so forth. It may be desirable to install the liner away from parking areas, or, if located in a parking area, to install bollards to prevent damage to the installation.

It may be desirable to avoid installation in wet clay soils or in habitually high water-table locations, or locations of high surface water retention. It may also be desirable to avoid installing ground sleeves close to large rocks and roots. The site may have a 1 m (40 inch) clearance, or more, from the ground sleeve location to any utilities; including storm sewer drain pipes. It may have a 3 m (10 ft), or more, clearance to a transformer, and the locally required set-back from fire hydrants. The liner should not, of course, be located directly above underground structures or utilities; including sewer drainpipes.

A site may be chosen that is substantially level from side-to-side when facing the installation from the front, although it may have a grade (e.g., a slight up-grade) in the direction of approach of the lift-truck. Unless blasting is expected, it is helpful to make sure that the depth to bedrock exceeds the depth of the liner. Assuming that a suitable site has been selected, such as may have good sub-soil drainage, and appropriate clearances from adjacent structures and uses, the well is excavated to depth and back-filled with a minimum of a 10 cm (4 inch) layer of compacted sand or granular 'A' gravel. Where there is more than one assembly installed, the spacing between the sleeves is carefully measured to assure minimum clearance. The clearance is greater where lift-truck access is oblique rather than perpendicular to the line of centers of adjacent units.

The installer seats the supplied anchor pins, of which there may be 8 in a set. Alternatively, the installer may use readily and locally available re-bar, cut to length. The anchor pins may be standard 20M (approx. ¾") rebar pins. They seat in the 8 holes or sockets, or seats near the bottom of the liner. The ground sleeve is hoisted into the pit using lifting equipment of adequate capacity, such as a back-hoe or crane. When cited, the liner is positioned level side-to-side and fore-and-aft. Care is taken to make sure that the pins are clear of any rocks, or stones, or debris that might obstruct the flow of concrete or the secure embedment of the pins in the concrete.

When straight and level, concrete is poured into the well about the bottom of the liner, to a depth of 8-12 inches, or slightly more, typically about 1 cu. yd. or 1 cu. meter of concrete, poured in an annulus about the bottom of the liner. The concrete is allowed to cure. Once it has cured, backfill is added. The backfill may be granular 'A' gravel (¾ minus). It is compacted evenly in 200-300 mm (8-12 inch) lifts with a greater than 95% compaction. Alternatively, non-shrink clear stone such as ¾" clear, may be used provided that landscape fabric is draped down all sides of the pit prior to back-filling. The landscape fabric prevents the adjacent soil fines from migrating into the aggregate over time. Alternatively, previously excavated soil may be used if it is not material that may freeze, such as clay or silt. It is compacted evenly in 200-300 mm (8-12 inch) lifts with a greater than 95% compaction. At each step, the installer may wish to verify that the liner is within 1" (preferably V) of roundness by measuring in directions 90 degrees apart (preferably four directions, 45 degrees apart). It is desirable not to drive equipment onto backfilled material, as it may tend to distort the ground sleeve.

Figure 8B:
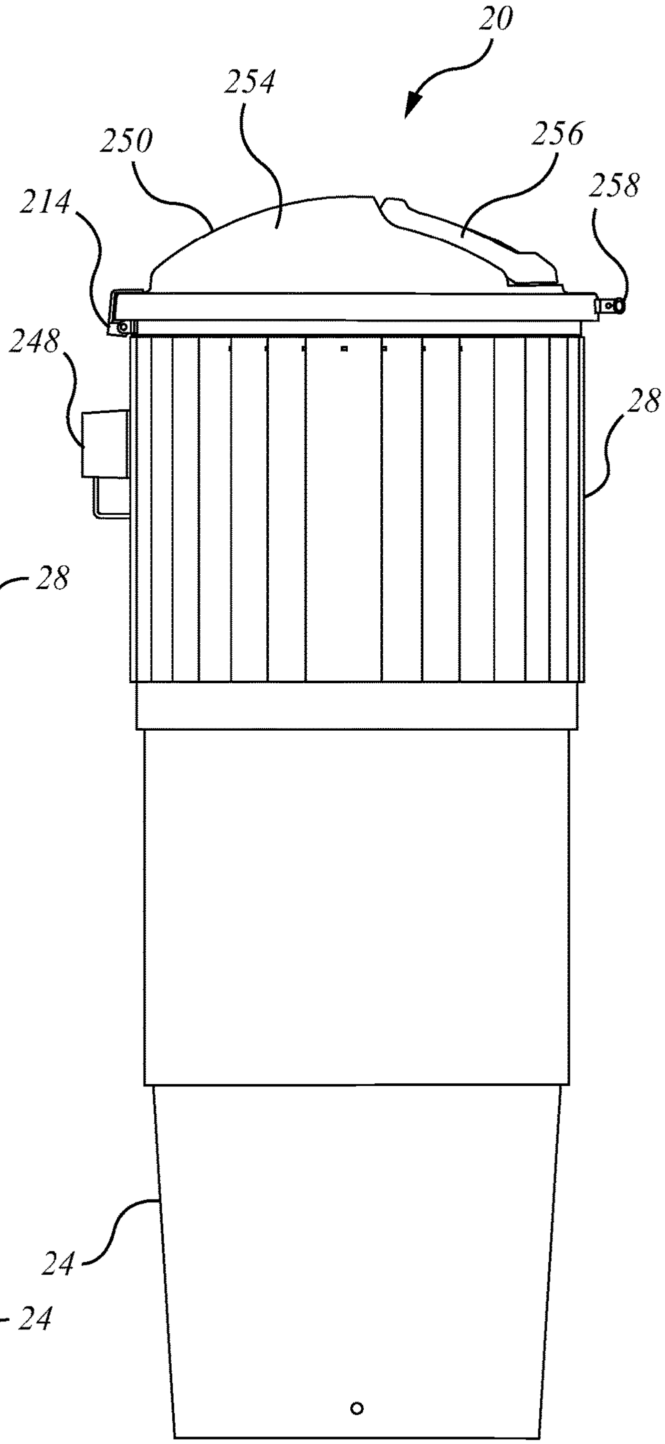
FIG. 8*b* shows a right hand side view of the apparatus of FIG. 8*a;*
Figure 8C:
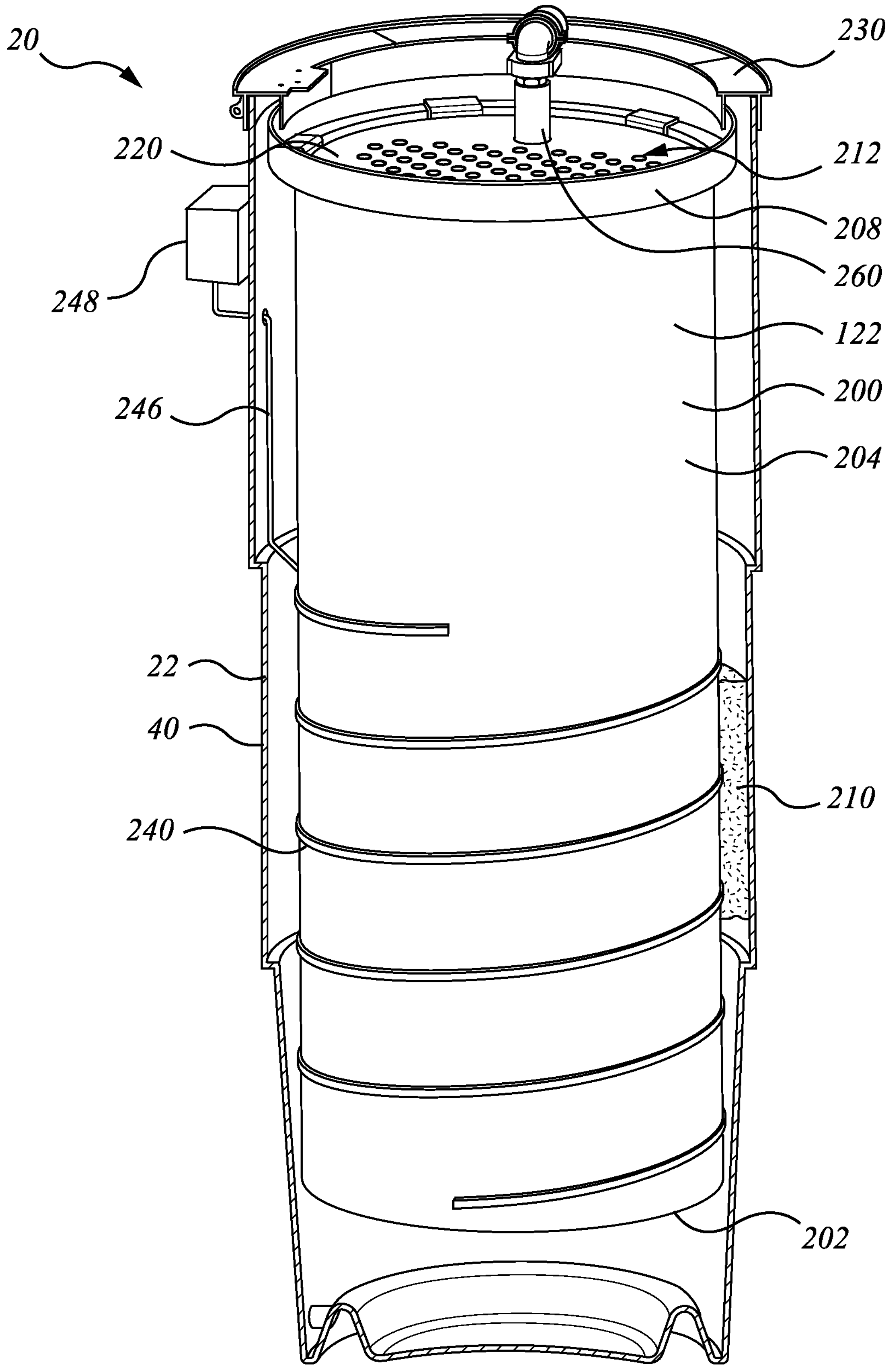
FIG. 8*c* shows a perspective view of the apparatus of FIG. 8*a* with the nearside half of the stationary well liner casing to permit understanding of internal details.
Figure 8D:
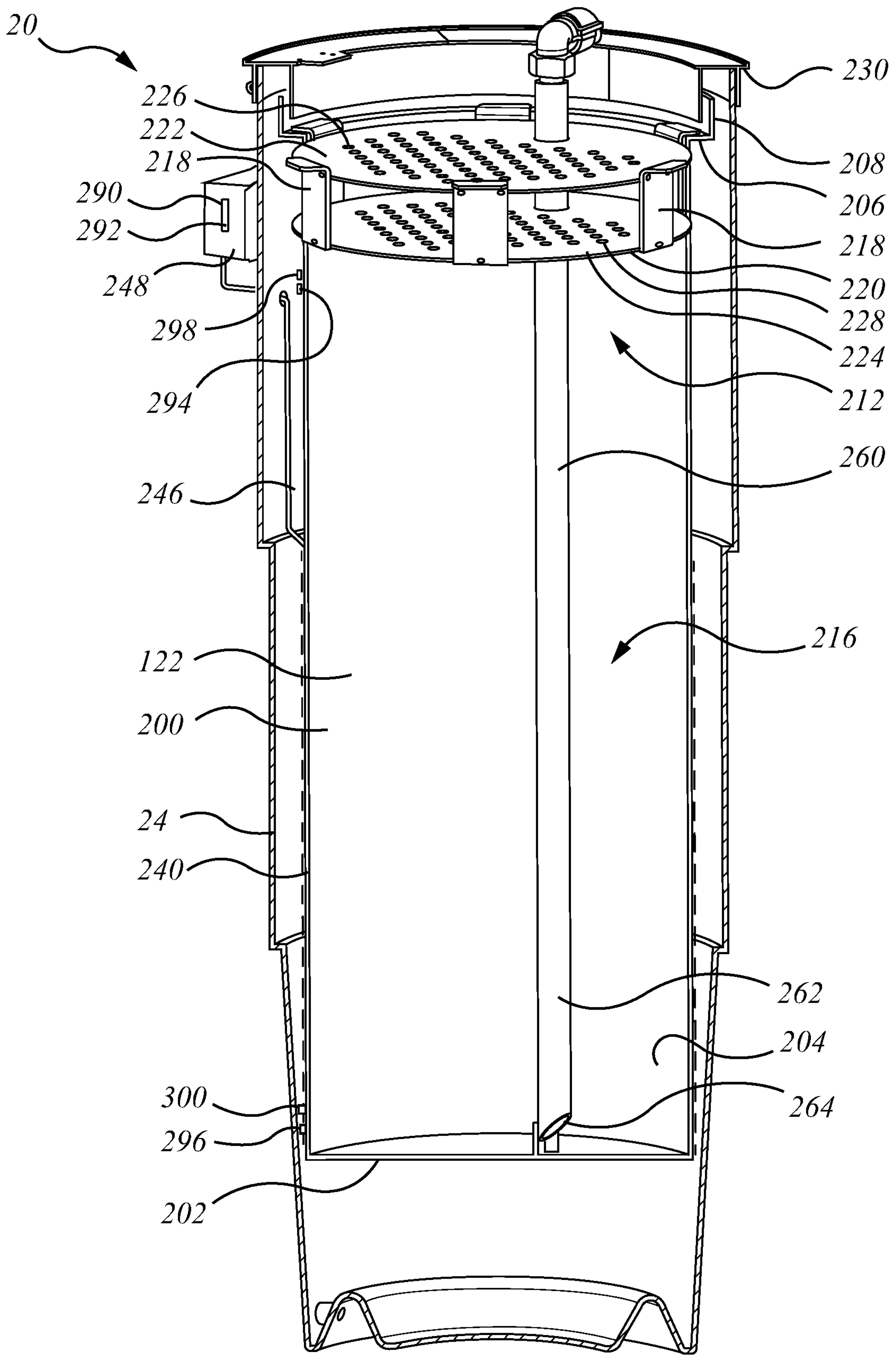
FIG. 8*d* is a similar perspective view to that of FIG. 8*c*, but with the further removal of the near side half of the liquid receptacle to expose additional internal details.
Figure 8E:
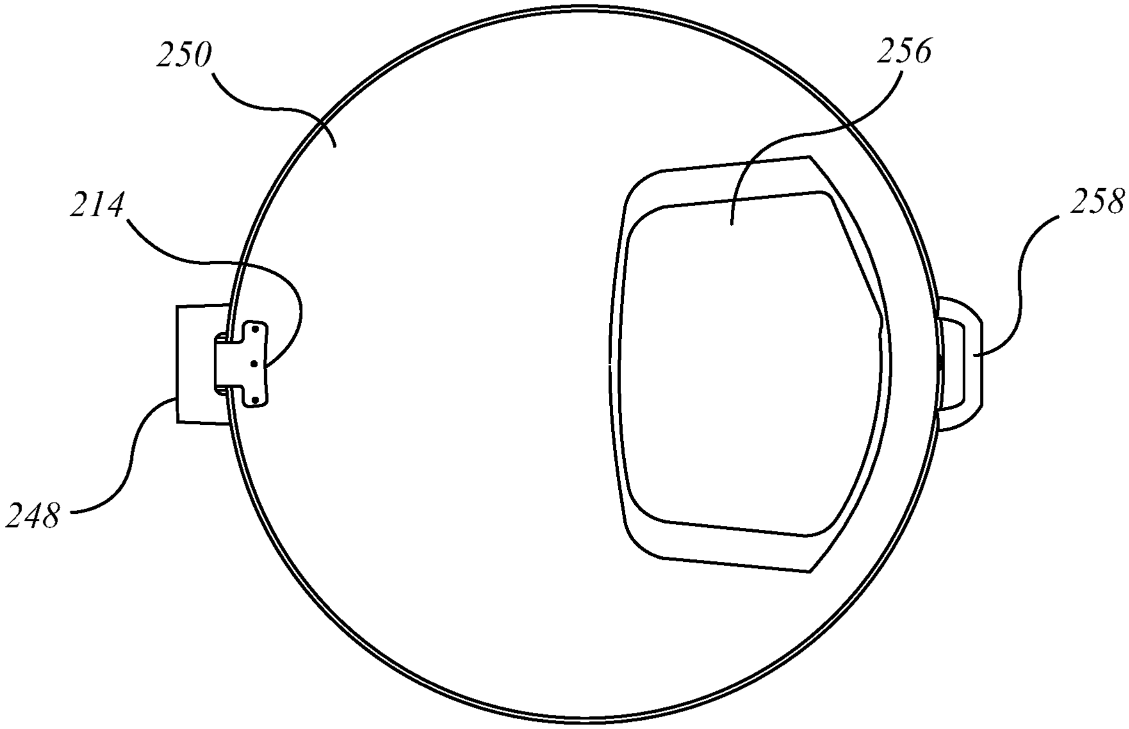
FIG. 8*e* is a top view of the apparatus of FIG. 8*a;*
Figure 8F:
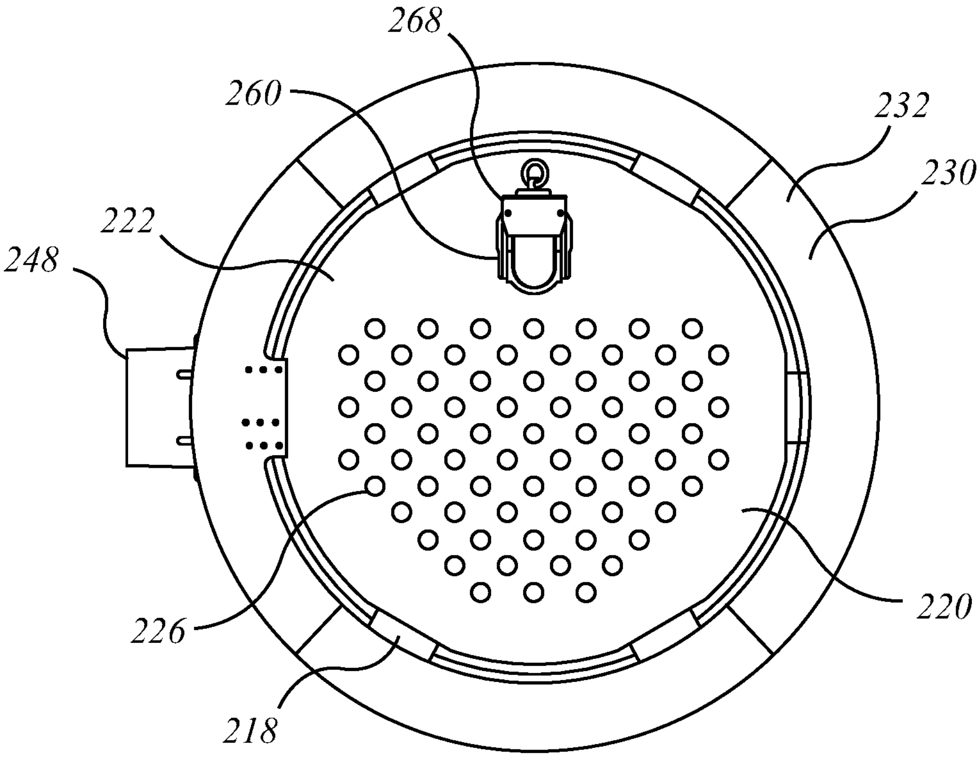
FIG. 8*f* is a top view of the apparatus of FIG. 8*a* with the lid removed.

FIGS. 8*a*, 8*b* and 8*c* relate to the installation of receptacle 22, of FIG. 8*c* as 122, suited to use with liquids such as used cooking oil or grease. The above ground portion of the container apparatus 20 of which receptacle 122 is a component, may have, and as illustrated does have, the same, or substantially the same, external appearance as a comparable embodiment for dry waste or general waste, such that it may tend not to draw attention to itself as a specialized oil or grease containment apparatus. The style of the container apparatus 20 of FIGS. 8*a* and 8*b* is different from the external styles of container apparatus 20 of FIG. 1*a*, but such difference is arbitrary, and the container apparatus 20 of FIGS. 8*a* and 8*b* could have the same appearance as that of FIG. 1*a*, or vice versa. That is to say, the style of container apparatus 20 of FIG. 1*a* is for emptying by the forks of a lift truck equipped with forks. The style of the embodiment of FIGS. 8*a* and 8*b* has the appearance of a crane lift style receptacle, such as may typically have a central lifting lug or hook in the venter of the lid. In the style of FIGS. 8*a* and 8*b* there is no lifting lug, as the unit is essentially permanent. For the purpose of brevity and avoidance of duplication, the description of apparatus 20, above, is applicable to apparatus 20 of FIGS. 8*a* and 8*b* unless otherwise noted.

Receptacle 122 may have the form of a container or well 200 that has a bottom wall 202 and an upstanding sidewall 204. Upstanding sidewall 204 is a peripheral wall, and in the embodiment illustrated is a circular cylindrical wall, although it could be tapered and could be stepped in the manner of the outer liner. Bottom wall 202 and sidewall 204 are joined together and co-operate to form a liquid containing enclosure, or periphery, or membrane. Well 200 can be made of a molded plastic. In some circumstances it can also be made of metal, such as stainless steel. Well 200 is smaller than, and nests within, liner 22 in a spaced relationship from the outer wall, such that well 200 is suspended and separated from liner 40. In contrast to the collection apparatus of FIG. 1*a*, in which visible housing 28 is part of receptacle assembly 22, it is part of the exterior liner assembly 24 in the example of FIGS. 8*a* and 8*b*. As installed, a layer of thermal insulation 210 is provided between the inner wall defined by well 200 and the outer wall defined by liner 40. A partial view of insulation is seen in FIG. 8*c*, but it is omitted from the other views so that other features can be seen with greater clarity. Insulation 210 extends both below bottom wall 202 and outside upstanding wall 204. Insulation 210 may be formed of a blanket or relatively stiff foam billet or sheeting of thermally insulating foam wrapped around wall 204. Alternatively, and as in the example of FIG. 8*c* the foam insulation may be injected in the gap after installation of well 200. In a further alternative, well 200 may be wrapped or encased in preformed or molded insulation that is smaller than the space of the gap to give a tolerance or clearance by which to permit insertion. Once inserted, foam insulation may then be introduced to fill the remaining clearance of the remaining gap. When expandable foam is installed in situ, the liner may be longer removable, and may be permanent.

The upper end or margin of upstanding wall 204 defines the opening 212 of well 200. That margin has an outwardly protruding peripherally extending flange 206. Flange 206 may be, and in the example shown is, a circular circumferential flange that extends in an horizontal radial plane. It extends to a longitudinal, cylindrical wall identified as outer rim 208, which may also be considered to be a flange, such than flange 206 defines a shoulder. Outer rim 208 forms a stiffened backing, or a doubler, or a load spreader by which well 200 is mounted to liner 24.

A strainer assembly, or labyrinth assembly 220 is mounted across opening 212. Labyrinth assembly, or strainer assembly 220 functions as, and may alternatively be termed as a flow brake. That is, liquid material that is poured into the receptacle defined by well 200 is prevented by the flow brake from being poured directly into the chamber, but rather the flow is broken up and divided by the flow brake to flow through the array of apertures in the flow brake panels or elements or filters or through the peripheral gap or slot between the outside edge of the filter element and the inside containment wall of the receptacle. To that end, strainer assembly 220 has a first member 222 (i.e., a first perforated brake panel) and a second member 224 (i.e., a second perforated brake panel) First member 222 and second member 224 may also be termed splash plates, or chicanes, or sieves, or diverters, or grates, or grilles, or strainers, or baffles, or deflectors, or, as noted, perforated brake panels. First and second members 222, 224 are perforated as at 226, 228 respectively to permit liquid to flow through them. However they may be called first member 222 and second member 224 are spaced apart axially, such that first member 222 is above, and spaced away from, second member 224. Members 222, 224 are positioned to cause inflowing material to have to deviate in direction. Moreover perforations 226 of first member 222 and perforations 228 of second member 224 are offset such that when installed the material in the well is not visible, i.e., there is no straight-line view in the axial direction into the interior of chamber 216 defined within well 200. Labyrinth assembly 200 includes a set of spacers or stand-offs 218 to which first and second members 222, 224 are mounted. Standoffs 218 may have, and in the embodiment shown do have, the form of angle brackets having a long vertical leg 192 to which the sieve members are mounted, and a short horizontal leg that extends radially outwardly, and that defines a finger, or toe, or grip, or cleat 194 that seats upon the circumferentially extending shoulder or shelf defined by flange 206. Inasmuch as the set of angle brackets defied by spacers 218 is spaced peripherally about first and second member 222, 224, cleats 194 engage flange 206 when labyrinth assembly 220 is inserted in the axial direction into well 200.

A collar assembly 230 includes a first member in the form of a peripherally extending ring plate 232, a pair of outer and inner depending flanges 234, 236 that sandwich the upper margin of liner 24, and a closing member in the form of an inside depending flange 238 that mates with the upstanding circumferential flange defined by rim 208. This attachment also traps cleats 194 axially, so that labyrinth assembly 220 cannot be removed. Collar assembly 230 may be made of a material such as steel. The outer flange is doubled such that the clinching load of fasteners 196 is spread in the metal, rather than tending to tear out of the molded plastic wall of liner 24. When in place, collar assembly 230 effectively locks strainer assembly 220 in place. Strainer assembly 230 is made of steel. Accordingly, the only way for used oil or grease to leave well 200 is by being pumped out through fitting 36, which is lockable to discourage theft. That is, a person seeking to take the contents of well 200 without permission would need to remove or destroy or cut through the steel plates of strainer assembly 200.

A heater 240 is provided. Heater 240 may have the form of a heating element 242 that is wrapped about the outside of upstanding sidewall 204. In the embodiment shown, heating element 240 is wrapped in a helical coil about sidewall 204. It may have, and in the example illustrated does have, the form of a heating element 242 sandwiched between two metal bands 244 that may tend to spread the heat. The heating element is against the inside wall, encased within insulation 210. The heating element may be, and in the embodiment illustrated is, located at a level on receptacle 122 that is below ground as installed. In the example shown it extends downwardly to the bottom of wall 204. A power cable 246 extends upwardly, and passes through a sidewall penetration in liner 24 to end at a terminal connection box and control box 248. Heating element 242 may be wired for either 110 V or 220 V. On installation terminal box may be at the back of the unit to be minimally visible.

Figure 9A:
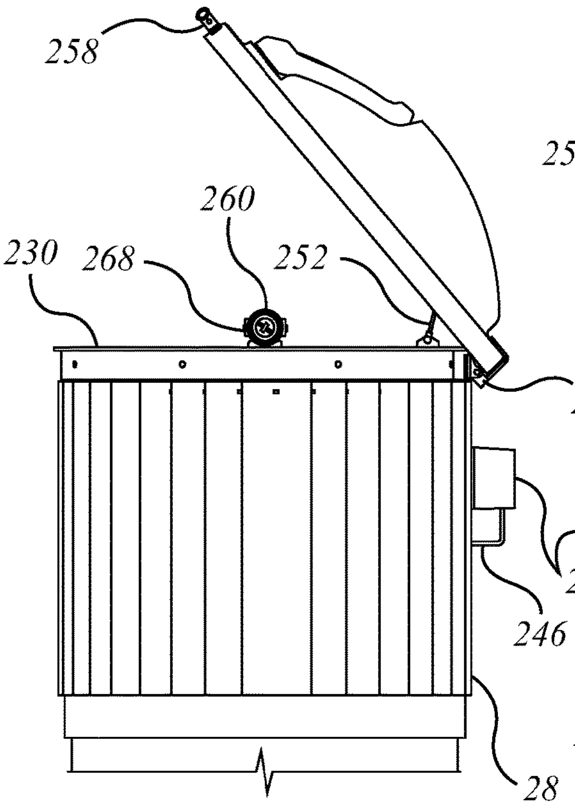
FIG. 9*a* is a partial rear view of the apparatus of FIG. 8*a* showing the lid raised.
Figure 9B:
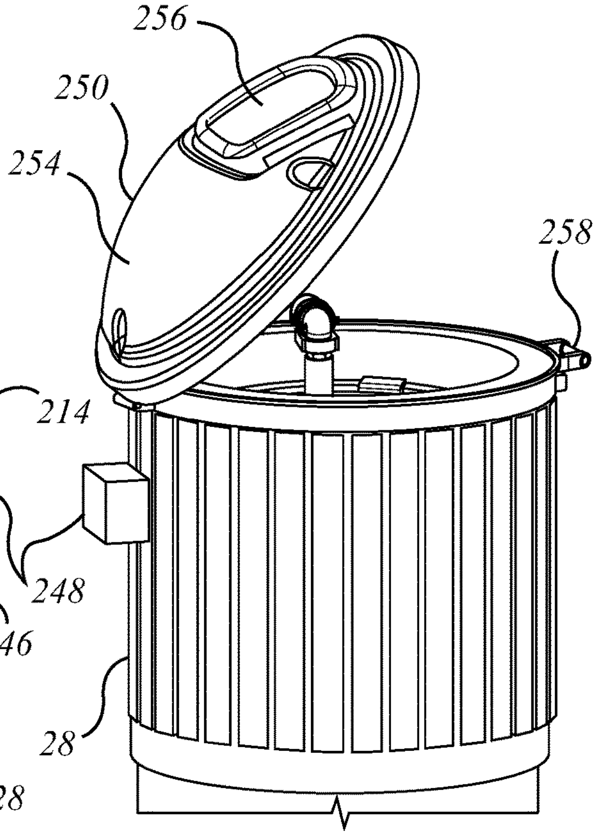
FIG. 9*b* shows the apparatus of FIG. 9*a* in perspective view showing internal details.
Figure 9C:
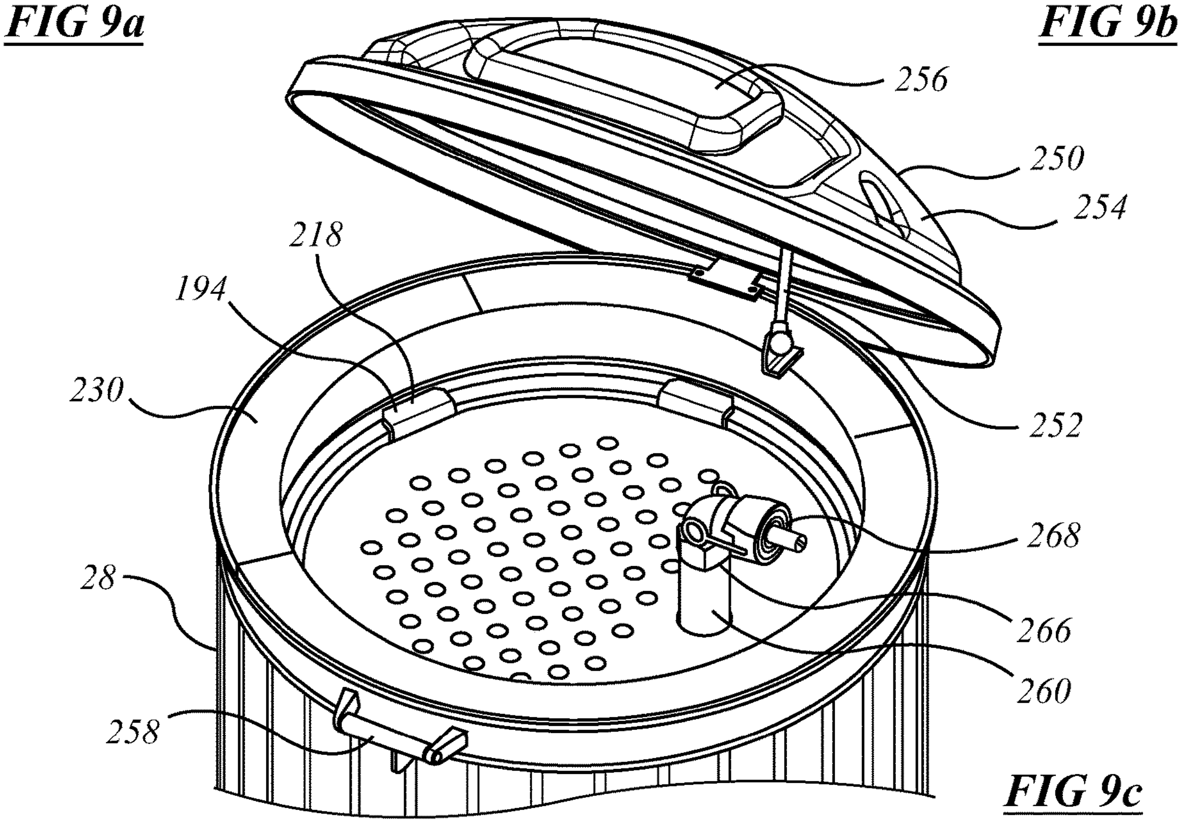
FIG. 9*c* is a further perspective view of the apparatus of FIG. 9*a;*
Figure 10:
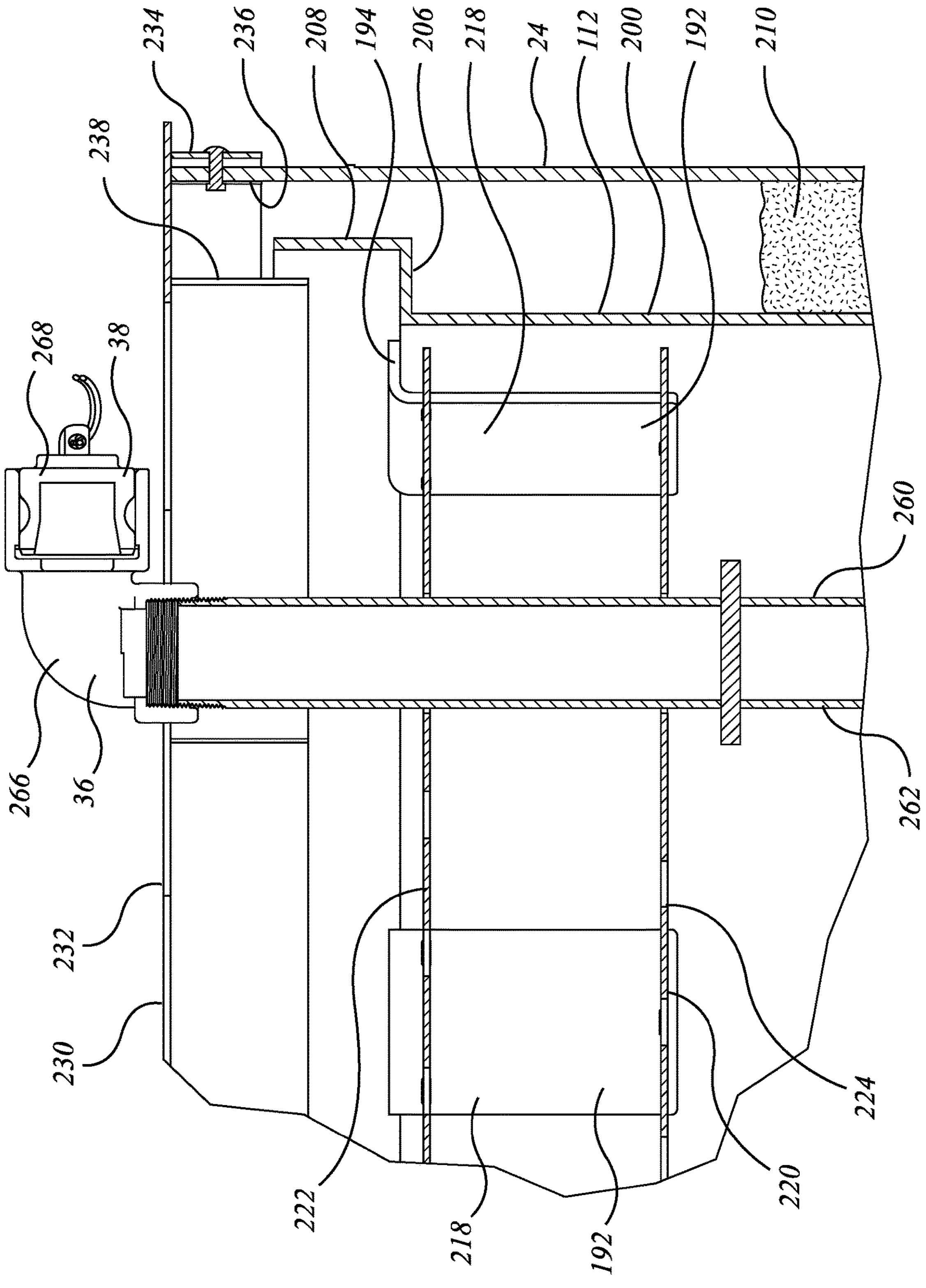
FIG. 10 is a partial cross-sectional view of the apparatus of FIG. 8*a* showing details of the constriction of the upper portion thereof.

There is a lid assembly 250 that is hingedly mounted to collar assembly 230, as at hinge 214, which is located at the rear of the unit. It may include a gas spring 252 to aid in counterbalancing the weight of the lid. Lid assembly 250 may have, and in the embodiment illustrated does have, a lid shell 254 having an inset secondary hatch or door 256 that is resiliently biased to a closed condition, but that may be pushed open to permit hot oil to be poured into receptacle 122. Lid assembly 250 is movable between first and second positions, namely a closed position (as in FIGS. 8*a* and 8*b*) and an open position (as in in FIGS. 9*a*, 9*b* and 9*c*) to permit receptacle 122 to be pumped out. For that purpose the forwardmost edge of lid assembly 250 is provided with a lifting handle 258, opposite to hinge 214. As may be noted, when lid assembly 250 is closed, the pump-out pipe connection is hidden, i.e., not visible from outside the unit. Lid assembly 250 may include a lock that requires a key, a combination, or an electronic signal to release. That is, handle 258 may include, or may be, a locking handle. This may be helpful to discourage the theft of used cooking oil.

As can be seen, fitting 36 may have the form, and in the embodiment illustrated does have the form of a pipe assembly 260 that includes a riser pipe 262 that reaches to the bottom of well 200, and that has a mitered inlet opening 264. It terminates at an elbow 266. Elbow 266 is swivel mounted to permit it to rotate relative to the vertical axis of riser pipe 262. It stands up like a periscope such that the outlet is higher than collar assembly 230. Elbow 266 has an outlet coupling 268 that may either be threaded or have a quick disconnect (i.e., quick release) fitting, either of them permitting a pump truck to connect and pump of well 200. The connector lies within the circumference of well 200, and, as such, the inner container opening is such that any grease or oil spillage from disconnecting the hose will drip down into the bin, i.e., receptacle 200, rather than onto the ground. Outlet coupling 268 may include a lock. As previously noted, when lid assembly 250 is closed, pipe assembly is not externally visible.

Figure 11:
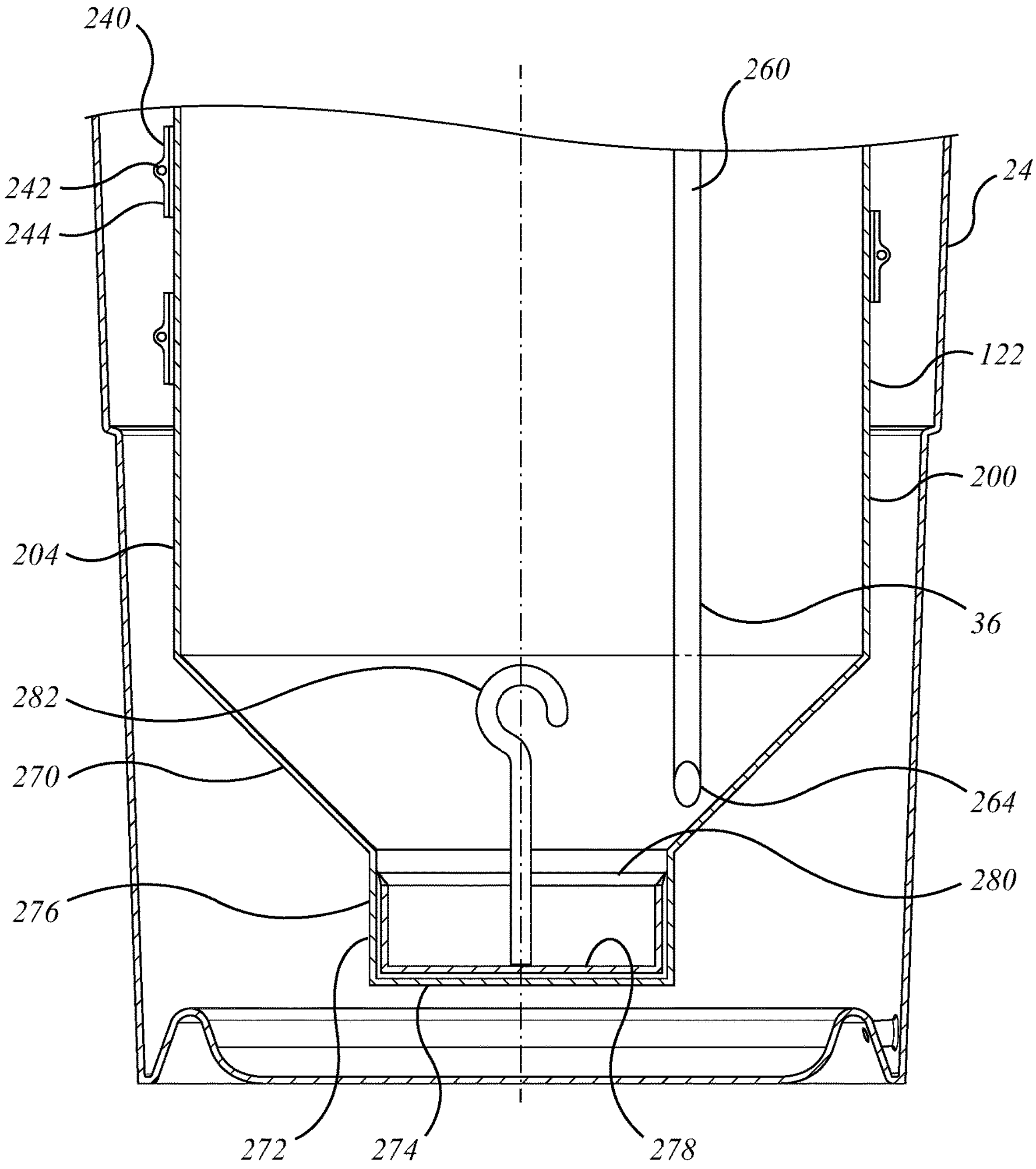
FIG. 11 is a partial cross-section of the lower portion of an embodiment of the apparatus of FIG. 8*a*.

In the alternate or additional embodiment of FIG. 11, the bottom end of well 200 has a converging conical bottom skirt or hopper 270, and a central accommodation identified as catchment or clean-out 272 that has a bottom wall 274 and an upstanding peripheral wall 276 that meets the conical skirt. A tray 278 fits in clean out 272, and may have a biased lip such as a spring loaded metal wiper 280 that rides on peripheral wall 276. Tray 278 has a lift in the form of a hook 282 by which tray 278 can be extracted and inserted as required. As may be understood, used cooking oil may not necessarily be well filtered, or filtered at all, for solids prior to deposition in well 200. Settling will occur in well 200, and from time to time it may accumulate to such an extent as to merit removal by lifting and emptying tray 278.

In the embodiment illustrated, terminal connection box 248 also houses an electronic control unit. The electronic control unit may, and in the embodiment illustrated does, receive one or the other of 110 V or 220 V 60 Hz input that is then rectified to provide a DC control voltage, as well as an output voltage and current to heating element 242. The controller may include, and in this instance does include, a thermostat and a temperature sensor or temperature sensing array 290. Array 290 may include, and in the embodiment illustrated does include, an ambient temperature sensor 292. In an optional embodiment it may also include an upper temperature sensor 294 and a lower temperature sensor 296. It may include a level sensor 298. Level sensor 298 may be a capacitance sensor, or other suitable level sensor of conventional design. There could be a series of temperature sensors 298 spaced vertically along the outside of well 200. In operation, if level sensor 298 is set, then it is time to pump out well 200, whatever the temperature of the material in well 200 may be. Optionally, there may also be a low level sensor 300, that is activated when well 200 is pumped-out as an indication that pumping can stop because the well has reached its empty condition. Alternatively, the pump truck can pump out liquid until no more liquid flows. If there is an ambient the external ambient temperature sensed at sensor 292 is such as to correlate with the material in the well 200 being liquid, then supply of electrical power to heating element 242 is stopped, e.g., by opening the main switch or relay. This temperature may be a temperature selected to ensure that the liquid will flow, such as −5 C (25 F) where experimentation has shown that the below-ground temperature in well 200 remains above freezing. Alternatively, the set point in the memory of the controller may also be at or above the freezing point of water, e.g., in the event water is mixed with the used cooking oil, or accidentally, inadvertently, or intentionally poured into well 200. Where used, lower temperature sensor 298 may be at a height that is at or below the resting sump level of liquid in well 200, and may have a temperature above the set point temperature for keeping the contents liquid. While the liquid level is low, upper temperature sensor 294 may have a temperature that is relatively closer to the ambient air temperature, and different from lower temperature sensor 296. When the liquid level reaches the wall height of upper temperature sensor 294, the temperature sensed there may be relatively closer to the temperature sensed at lower temperature sensor 296, and provides an indication both of whether the material in well 200 is at a suitable liquid temperature, and whether well 200 is approaching its full status, and needs to be pumped out. It also provides a back-up temperature indication to indicate whether lower temperature sensor 294 has failed. It may be that if present, either or both of temperature sensors 294, 296 may be mounted to the riser pipe 262 at upper and lower locations respectively, such as to facilitate replacement is necessary. They can also be mounted to the outside of well 200.

In contrast to a known partially buried system, controller 248 does not need to be plugged in or turned on manually by the operator. Rather, once installed, controller 248 automatically turns itself on or off, according to the ambient air temperature. In operation, the controller may typically be temperature limited. It can also be current limited. That is, controller 248 may contain a thermostat, or be electrically programmed to store a desired temperature value in the manner of a thermostat. Heating element 142 may be a self-regulating heating cable. Such programming and control may be remote, with the control signal being provided externally, whether by a hard-wired connection or by wireless or other telephonic means.

In any case, the controller may operate in an “On-Off” controller manner between upper and lower boundaries of a control band. The control band may, for example, have an upper limit 1 C above the thermostat set point, and a lower limit 1 C below that set point to give a 2 C hysteresis band width between the turn on condition at the lower boundary and the turn off condition at the upper boundary. Whether controlled in this manner or not, heating element 242 may also be current limited, such that, whatever the temperature may be, a heating current may not exceed a fixed upper limit of amperage. Controller 248 may also include an alarm circuit or alarm indicator to transmit or display a fault message in the event of any sensed failure in the control elements. Where a controller 248 uses only a thermostat 292 and a self-regulating heating element 242 is used, the heating element is operated at any time the external ambient temperature falls below the set point.

It may also be noted that the used cooking oil or grease containment receptacle 20 of FIGS. 8*a* and 8*b* is double walled, i.e., has the inner liquid containment wall of well 200, and has the outer containment structure of liner 24. In recent times the issue of ground contamination has become a more prominent environment concern. Ground remediation is an expensive, and sometimes rather difficult process. Used cooking oils and greases may be a hazard for ground contamination if they should be able to leak from their containment vessel. Whereas previous containment may have relied upon single walled containers, the presently described apparatus of FIGS. 8*a* through 11 provides a double-walled containment apparatus for such used cooking oil or grease.

The “silo” form of containment receptacle apparatus 20 is a semi in-ground container that can be used for the collection and containment of used cooking oil. The unit is fitted with a heavy-duty tamper resistant sieve to prevent solids from entering the storage container defined by well 200. It has a standard cam-lock quick release pump out connector fitting. It has a thermostatically controlled heating element 140. It has a hinged main led with a gas strut to hold the lid open when the well is being filled or emptied. It has a thermostat to turn heating element 142 when the ambient temperature drops to a set point to maintain the oil temperature such that the oil remains liquid. The system is completely automatic and requires no manual operation or intervention. The 120 VAC connection is hard-wired through electrical conduit connect to the control box of controller 148 affixed to the side of the unit.

As may be understood, although the foregoing description has been made in the context of used cooking oil, or grease, reference to "oil" in this description may be understood to refer not only to grease collected from cooking, but also to used mineral oil, and oils and grease more generally that requires a minimum temperature to be suitable for being pumped out. The use of a double-walled apparatus for storing oils, whether heated or otherwise, may also be employed in the context of used motor oil, used hydraulic oil, used brake fluids, and so on.

To summarize, there is an in-ground receptacle having an outer wall structure that seats at least partially in the ground; and an inner wall structure that nests within the outer wall structure. The inner wall structure defines a liquid containing receptacle that is spaced from the outer wall structure. There is a heating element 140 mounted to the inner wall structure outside the receptacle. There is a layer of thermal insulation 210 between the outer wall structure and the inner wall structure. Heating element 140 is located between the insulation and the receptacle. The receptacle has an opening 212 through which to pour material such as hot used oil or grease into the receptacle, and there is a recessed flow brake positioned to force deviation of flow of materials introduced through the opening. The flow brake includes at least a first strainer 222, and there is a second strainer 224 underlying the first strainer, and all flow paths through the first and second strainers require deviation of fluid passing therethrough. The strainer assembly is made of steel and is permanently captured in place. The in-ground receptacle has a lid that is movable between an open position and a closed position relative to the receptacle; there is an off-take through which the receptacle is emptied, the off-take has an outlet; and, when the lid is closed, the outlet is within the lid. The outlet includes a variable orientation coupling. The heating element has an automated thermostatic control. The thermostatic control has a set point below the freezing point of water. The liquid containing receptacle is jacketed by thermal insulation located between the liquid containing receptacle and the outer wall receptacle.

That is, there is an in-ground receptacle having a double-walled liquid containment receptacle operable to contain used oil, the receptacle having an above ground portion and a below ground portion, the below ground portion having a depth, the above ground portion having a height, the depth being greater in magnitude than the height. It has an inner well and an outer ground liner; there is a jacket of thermal insulation between the inner well and the outer ground liner. There is a heating element mounted to the inner well and the receptacle has an automated controller, at least a first temperature sensor and a thermostat, and the controller is operable automatically to heat materials within the containment receptacle according to a setting of the thermostat. The receptacle has an opening through which liquids can be poured; a strainer assembly that partially obstructs the opening; and a pump-out apparatus; and the strainer being permanently captured in place. The receptacle has a lid that is movable between open and closed positions, and when the lid is closed the pump-out is concealed within the receptacle. The pump-out passes through the strainer assembly. The pump-out apparatus includes a lock. The lid has a lock. There is insulation sandwiched between the inner and outer walls of the double walled containment receptacle structure.

Although the various embodiments have been illustrated and described herein, the principles of the present invention are not limited to these specific examples which are given by way of illustration, but only by a purposive reading of the claims.

I claim:

1. An in-ground liquid waste receptacle apparatus, comprising:
- an outer wall structure that seats at least partially in the ground;
- an inner wall structure that nests within the outer wall structure;
- said inner wall structure defining a liquid containing receptacle in which to collect liquid waste;
- said liquid containing receptacle having an opening through which to pour liquid waste into said liquid containing receptacle;
- said liquid containing receptacle of said inner wall structure being spaced from said outer wall structure;
- a heating element mounted to said inner wall structure outside said liquid containing receptacle, said heating element being operable to warm liquid waste contained within said liquid containing receptacle.

2. The in-ground liquid waste receptacle apparatus of claim 1 wherein there is a layer of thermal insulation between said outer wall structure and said inner wall structure, and said heating element is located between said insulation and said liquid containing receptacle.

3. The in-ground liquid waste receptacle apparatus of claim 1 wherein there is a recessed flow brake positioned to force deviation of flow of liquid waste introduced through said opening into said liquid containing receptacle.

4. The in-ground liquid waste receptacle apparatus of claim 3 wherein said recessed flow brake includes at least a first strainer, and there is a second strainer underlying the first strainer, and all flow paths through said first and second strainers require deviation of fluid passing therethrough.

5. The in-ground liquid waste receptacle apparatus of claim 3 wherein said strainer assembly is made of steel and is permanently captured in place.

6. The in-ground liquid waste receptacle apparatus of claim 1 wherein said in-ground liquid waste receptacle apparatus has a lid that is movable between an open position and a closed position relative to said liquid containing receptacle; there is an off-take through which said liquid containing receptacle is emptied, said off-take has an outlet; and, when said lid is closed, said outlet is within said lid.

7. The in-ground liquid waste receptacle apparatus of claim 6 wherein said outlet includes a variable orientation coupling.

8. The in-ground liquid waste receptacle apparatus of claim 1 wherein said heating element has an automated thermostatic control.

9. The in-ground liquid waste receptacle apparatus of claim 8 wherein said thermostatic control has a set point below the freezing point of water.

10. The in-ground liquid waste receptacle apparatus of claim 1 wherein the liquid containing receptacle is jacketed by thermal insulation located between the liquid containing receptacle and said outer wall receptacle.

11. An in-ground liquid waste receptacle apparatus comprising a double-walled liquid containment receptacle, said double-walled liquid containment receptacle having an outer wall structure that defines an outer ground liner that seats at least partially in the ground and an inner wall structure that nests within the outer wall structure; the inner wall structure defining a liquid containing inner well operable to contain used oil, said liquid waste receptacle apparatus having an above ground portion and a below ground portion, said below ground portion having a depth, said above ground portion having a height, said depth being greater in magnitude than said height.

12. The in-ground liquid waste receptacle apparatus of claim 11 wherein there is a jacket of thermal insulation between said liquid containing inner well and said outer ground liner.

13. The in-ground liquid waste receptacle apparatus of claim 12 wherein there is a heating element mounted to said liquid containing inner well and said liquid waste receptacle apparatus has an automated controller, at least a first temperature sensor and a thermostat, and said controller is operable automatically to heat liquid waste within said liquid containing inner well of said liquid waste receptacle apparatus according to a setting of said thermostat.

14. The in-ground liquid waste receptacle apparatus of claim 11 wherein said receptacle has an opening through which liquids can be poured into said liquid waste containing inner well; a strainer assembly that partially obstructs said opening; and a pump-out apparatus operable during emptying of liquid waste from said inner well; and said strainer being permanently captured in place.

15. The in-ground liquid waste receptacle apparatus of claim 14 wherein said receptacle has a lid that is movable between open and closed positions, and when said lid is closed said pump-out apparatus is concealed within said receptacle.

16. The in-ground liquid waste receptacle apparatus of claim 14 wherein said pump-out passes through said strainer assembly.

17. The in-ground liquid waste receptacle apparatus of claim 14 wherein said pump-out apparatus includes a lock.

18. The in-ground liquid waste receptacle apparatus of claim 15 wherein said lid has a lock.

19. The in-ground liquid waste receptacle apparatus of claim 11 wherein there is thermal insulation included between said inner wall structure and said outer wall structure of the double-walled containment receptacle.

20. An in-ground liquid waste receptacle apparatus comprising:

a double-walled liquid containment receptacle, said double-walled liquid containment receptacle having an outer wall structure that defines an outer ground liner that seats at least partially in the ground and an inner wall structure that nests within the outer wall structure;

said ground liner being tapered, said ground liner having a top end and a bottom end, said top end being wider than said bottom end, and, when installed, said inner wall structure nests within said ground liner;

the inner wall structure defining a liquid containing inner well operable to contain used oil, said liquid waste receptacle apparatus having an above ground portion and a below ground portion, said below ground portion having a depth, said above ground portion having a height, said depth being greater in magnitude than said height;

there being a jacket of thermal insulation between said liquid containing inner well and said outer ground liner;

there is a heating element mounted between said jacket of thermal insulation and said liquid containing inner well, said heating element being operable to heat to heat liquid waste within said liquid containing inner well of said liquid waste receptacle apparatus;

said receptacle has an opening through which liquids can be poured into said liquid waste containing inner well; a strainer assembly that partially obstructs said opening; and a pump-out apparatus operable during emptying of liquid waste from said inner well.

* * * * *